United States Patent
Walker et al.

(10) Patent No.: US 11,691,929 B2
(45) Date of Patent: *Jul. 4, 2023

(54) FERTILISER

(71) Applicant: Incitec Fertilizers Pty Limited, Southbank (AU)

(72) Inventors: Charles Norman Walker, Southbank (AU); Nicholas Hogan, Southbank (AU); Ellen Durack, Southbank (AU); Roya Khalil, Southbank (AU); Timothy Hughes, Southbank (AU)

(73) Assignee: Incitec Fertilizers Pty Limited

( * ) Notice: Subject to any disclaimer, the term of this patent is extended or adjusted under 35 U.S.C. 154(b) by 0 days.

This patent is subject to a terminal disclaimer.

(21) Appl. No.: 17/480,874

(22) Filed: Sep. 21, 2021

(65) Prior Publication Data

US 2022/0119321 A1   Apr. 21, 2022

Related U.S. Application Data

(63) Continuation of application No. 17/137,951, filed on Dec. 30, 2020, now Pat. No. 11,124,461, which is a (Continued)

(30) Foreign Application Priority Data

Jul. 4, 2019   (AU) ............................... 2019902376
Mar. 31, 2020   (AU) ............................... 2020900981

(51) Int. Cl.
   C05G 1/00   (2006.01)
   C05G 5/12   (2020.01)
   (Continued)

(52) U.S. Cl.
   CPC ................ *C05G 1/00* (2013.01); *C05B 1/02* (2013.01); *C05B 7/00* (2013.01); *C05B 17/00* (2013.01);
   (Continued)

(58) Field of Classification Search
   None
   See application file for complete search history.

(56) References Cited

U.S. PATENT DOCUMENTS 965,109 A   7/1910   Horvath et al.
3,988,355 A   10/1976   Morozowich
(Continued)

FOREIGN PATENT DOCUMENTS

AU   2003286601   5/2004
AU   207243632   11/2007
(Continued)

OTHER PUBLICATIONS

International Search Report and Written Opinion dated Aug. 25, 2020 for international application PCT/AU2020/050701.
(Continued)

*Primary Examiner* — Wayne A Langel
(74) *Attorney, Agent, or Firm* — Dorsey & Whitney LLP

(57) ABSTRACT

A dry and solid fertiliser in the form of discreet particles is provided. The particles of the dry and solid fertiliser comprise a homogenous mixture of organic and inorganic materials. The inorganic material comprises at least one of the NPKS nutrients. The organic material comprises a carbon-labile substantially sterile product of organic waste.

20 Claims, 12 Drawing Sheets

Table 1 - Organic Material (Post Torrefaction)

| | N % | P % | K % | S % | Total Organic Carbon % | Moisture Content % | E.Coli MPN/g | Salmonella per 50g | Listeria per 50g | Total Coliforms MPN/g |
|---|---|---|---|---|---|---|---|---|---|---|
| Torrefied Organic Mix (Chicken litter 50%, chicken manure 40%, leonardite 10%) | 4.2 | 1.5 | 2.8 | 0.9 | 35.3 | 10.5 | <3 | Not Detected | Not Detected | <3 |
| Torrefied Organic Mix (Chicken litter 52%, chicken manure 32%, leonardite 16%) | 4.0 | 1.3 | 2.8 | 0.8 | 37.4 | 3.87 | <3 | Not Detected | Not Detected | <3 |
| Torrefied Organic Mix (Wood shavings 100%) | 2.2 | 1.1 | 2.2 | 0.8 | 40.7 | 0.587 | <3 | Not Detected | Not Detected | <3 |

Related U.S. Application Data continuation of application No. PCT/AU2020/050701, filed on Jul. 3, 2020.

(51) Int. Cl.

| | |
|---|---|
| C05D 1/00 | (2006.01) |
| C05C 3/00 | (2006.01) |
| C05C 1/00 | (2006.01) |
| C05C 9/00 | (2006.01) |
| C05C 11/00 | (2006.01) |
| C05B 7/00 | (2006.01) |
| C05B 17/00 | (2006.01) |
| C05C 5/04 | (2006.01) |
| C05C 5/02 | (2006.01) |
| C05B 1/02 | (2006.01) |
| C05D 9/00 | (2006.01) |

(52) U.S. Cl.
CPC .................. *C05C 1/00* (2013.01); *C05C 3/00* (2013.01); *C05C 5/02* (2013.01); *C05C 5/04* (2013.01); *C05C 9/00* (2013.01); *C05C 11/00* (2013.01); *C05D 1/00* (2013.01); *C05D 9/00* (2013.01); *C05G 5/12* (2020.02)

(56) References Cited

U.S. PATENT DOCUMENTS

| | | | |
|---|---|---|---|
| 6,048,374 | A | 4/2000 | Green |
| 6,962,616 | B1 | 11/2005 | Bandosz et al. |
| 7,887,615 | B2 | 2/2011 | Spindler et al. |
| 8,202,332 | B2 | 6/2012 | Agblevor |
| 8,747,797 | B2 | 6/2014 | Shearer et al. |
| 8,764,873 | B2 | 7/2014 | Nevin |
| 8,845,772 | B2 | 9/2014 | Schubert et al. |
| 8,920,525 | B2 | 12/2014 | Despen et al. |
| 9,328,032 | B2 | 5/2016 | Shearer et al. |
| 9,381,493 | B2 | 7/2016 | Kirk et al. |
| 9,382,166 | B1 | 7/2016 | Joblin, Jr. et al. |
| 9,732,360 | B2 | 8/2017 | Chen et al. |
| 9,809,702 | B2 | 11/2017 | Mohanty et al. |
| 9,845,440 | B2 | 12/2017 | Mennell et al. |
| 9,873,639 | B1 | 1/2018 | Doccola et al. |
| 9,919,976 | B1 | 3/2018 | Joblin, Jr. et al. |
| 10,131,840 | B2 | 11/2018 | Liu et al. |
| 10,173,936 | B2 | 1/2019 | Fiato et al. |
| 10,233,131 | B2 | 3/2019 | Shearer et al. |
| 10,259,025 | B2 | 4/2019 | Li et al. |
| 10,259,753 | B2 | 4/2019 | Chaudhry |
| 11,124,461 | B2 * | 9/2021 | Walker .................. C05C 5/02 |
| 2004/0111968 | A1 | 6/2004 | Day et al. |
| 2012/0125064 | A1 | 5/2012 | Joseph et al. |
| 2013/0137154 | A1 | 5/2013 | Reep |
| 2013/0312472 | A1 | 11/2013 | Brehmer et al. |
| 2014/0101992 | A1 | 4/2014 | Mennell et al. |
| 2014/0110240 | A1 | 4/2014 | Mennell et al. |
| 2015/0075326 | A1 | 3/2015 | Despen et al. |
| 2015/0128672 | A1 | 5/2015 | Shearer et al. |
| 2015/0167026 | A1 | 6/2015 | Lewis |
| 2015/0197457 | A1 | 7/2015 | Aldridge et al. |
| 2015/0300738 | A1 | 10/2015 | Brock et al. |
| 2016/0053182 | A1 | 2/2016 | Ericsson et al. |
| 2016/0159703 | A1 | 6/2016 | Lodwig et al. |
| 2016/0200634 | A1 | 7/2016 | Zaseybida et al. |
| 2016/0264895 | A1 | 9/2016 | Lloyd |
| 2017/0121234 | A1 | 5/2017 | Arioli et al. |
| 2017/0144944 | A1 | 5/2017 | Gold et al. |
| 2017/0197192 | A1 | 7/2017 | Malyala et al. |
| 2018/0009720 | A1 | 1/2018 | Wilson et al. |
| 2018/0119008 | A1 | 5/2018 | Liu et al. |
| 2018/0127672 | A1 | 5/2018 | Mennell et al. |
| 2018/0134633 | A1 | 5/2018 | Nave et al. |
| 2019/0002764 | A1 | 1/2019 | Lee |
| 2020/0017418 | A1 | 1/2020 | Martin et al. |
| 2020/0113186 | A1 | 4/2020 | Morash et al. |
| 2021/0147309 | A1 | 5/2021 | Walker et al. |

FOREIGN PATENT DOCUMENTS

| | | |
|---|---|---|
| AU | 2010246895 | 1/2012 |
| AU | 2010355257 | 1/2013 |
| AU | 2016213812 | 9/2016 |
| AU | 2016101635 | 10/2016 |
| CN | 1323763 | 11/2001 |
| CN | 1997590 | 7/2007 |
| CN | 101172899 | 5/2008 |
| CN | 102101750 | 6/2011 |
| CN | 102167628 | 8/2011 |
| CN | 102180747 | 9/2011 |
| CN | 102219604 | 10/2011 |
| CN | 102350308 | 2/2012 |
| CN | 102358714 | 2/2012 |
| CN | 102380402 | 3/2012 |
| CN | 102424642 | 4/2012 |
| CN | 102459509 | 5/2012 |
| CN | 102603383 | 7/2012 |
| CN | 102634355 | 8/2012 |
| CN | 102660308 | 9/2012 |
| CN | 102660309 | 9/2012 |
| CN | 102674987 | 9/2012 |
| CN | 102674989 | 9/2012 |
| CN | 102701859 | 10/2012 |
| CN | 102775236 | 11/2012 |
| CN | 102786326 | 11/2012 |
| CN | 102807459 | 12/2012 |
| CN | 102807872 | 12/2012 |
| CN | 102822122 | 12/2012 |
| CN | 102826919 | 12/2012 |
| CN | 102850120 | 1/2013 |
| CN | 102863285 | 1/2013 |
| CN | 102863286 | 1/2013 |
| CN | 102936511 | 2/2013 |
| CN | 101992857 | 3/2013 |
| CN | 102992559 | 3/2013 |
| CN | 102992855 | 3/2013 |
| CN | 102992856 | 3/2013 |
| CN | 102992858 | 3/2013 |
| CN | 102992859 | 3/2013 |
| CN | 102992860 | 3/2013 |
| CN | 102992861 | 3/2013 |
| CN | 102992862 | 3/2013 |
| CN | 102992863 | 3/2013 |
| CN | 102992864 | 3/2013 |
| CN | 103011992 | 4/2013 |
| CN | 103011993 | 4/2013 |
| CN | 103011994 | 4/2013 |
| CN | 103011995 | 4/2013 |
| CN | 103011997 | 4/2013 |
| CN | 103011998 | 4/2013 |
| CN | 103011999 | 4/2013 |
| CN | 103012000 | 4/2013 |
| CN | 103012001 | 4/2013 |
| CN | 103012003 | 4/2013 |
| CN | 103030469 | 4/2013 |
| CN | 103044151 | 4/2013 |
| CN | 103044152 | 4/2013 |
| CN | 103044153 | 4/2013 |
| CN | 103044155 | 4/2013 |
| CN | 103044156 | 4/2013 |
| CN | 103120002 | 4/2013 |
| CN | 103074094 | 5/2013 |
| CN | 103088070 | 5/2013 |
| CN | 103100561 | 5/2013 |
| CN | 103168801 | 6/2013 |
| CN | 103193538 | 7/2013 |
| CN | 103193551 | 7/2013 |
| CN | 103319265 | 9/2013 |
| CN | 103359829 | 10/2013 |
| CN | 103435410 | 12/2013 |
| CN | 103435411 | 12/2013 |
| CN | 103449915 | 12/2013 |
| CN | 103467185 | 12/2013 |
| CN | 103611497 | 3/2014 |
| CN | 103708982 | 4/2014 |
| CN | 103772026 | 5/2014 |
| CN | 103788954 | 5/2014 |

(56) References Cited

FOREIGN PATENT DOCUMENTS

| | | |
|---|---|---|
| CN | 103804075 | 5/2014 |
| CN | 103833274 | 6/2014 |
| CN | 103910579 | 7/2014 |
| CN | 103990430 | 8/2014 |
| CN | 104001473 | 8/2014 |
| CN | 104030738 | 9/2014 |
| CN | 104130087 | 11/2014 |
| CN | 104177194 | 12/2014 |
| CN | 104193536 | 12/2014 |
| CN | 104211545 | 12/2014 |
| CN | 104258809 | 1/2015 |
| CN | 104292044 | 1/2015 |
| CN | 104311367 | 1/2015 |
| CN | 104326833 | 2/2015 |
| CN | 104355901 | 2/2015 |
| CN | 104355902 | 2/2015 |
| CN | 104355903 | 2/2015 |
| CN | 104355906 | 2/2015 |
| CN | 104355907 | 2/2015 |
| CN | 104388094 | 3/2015 |
| CN | 104446750 | 3/2015 |
| CN | 104446935 | 3/2015 |
| CN | 104446957 | 3/2015 |
| CN | 104447134 | 3/2015 |
| CN | 104447135 | 3/2015 |
| CN | 104478636 | 4/2015 |
| CN | 104496630 | 4/2015 |
| CN | 104496638 | 4/2015 |
| CN | 104529651 | 4/2015 |
| CN | 104741078 | 7/2015 |
| CN | 104762168 | 7/2015 |
| CN | 104762236 | 7/2015 |
| CN | 104772321 | 7/2015 |
| CN | 104785212 | 7/2015 |
| CN | 104789228 | 7/2015 |
| CN | 104789229 | 7/2015 |
| CN | 104817378 | 8/2015 |
| CN | 104817380 | 8/2015 |
| CN | 104817382 | 8/2015 |
| CN | 104817384 | 8/2015 |
| CN | 104817386 | 8/2015 |
| CN | 104829293 | 8/2015 |
| CN | 104844317 | 8/2015 |
| CN | 104860744 | 8/2015 |
| CN | 10482327 | 9/2015 |
| CN | 104876406 | 9/2015 |
| CN | 104926533 | 9/2015 |
| CN | 104926545 | 9/2015 |
| CN | 104946620 | 9/2015 |
| CN | 104958865 | 10/2015 |
| CN | 104998620 | 10/2015 |
| CN | 105001873 | 10/2015 |
| CN | 105060669 | 11/2015 |
| CN | 105060982 | 11/2015 |
| CN | 105061086 | 11/2015 |
| CN | 105085057 | 11/2015 |
| CN | 105085057 A | 11/2015 |
| CN | 105237148 | 1/2016 |
| CN | 105268724 | 1/2016 |
| CN | 105294363 | 2/2016 |
| CN | 105295938 | 2/2016 |
| CN | 105344708 | 2/2016 |
| CN | 105347907 | 2/2016 |
| CN | 105384579 | 3/2016 |
| CN | 105419807 | 3/2016 |
| CN | 105481563 | 4/2016 |
| CN | 105536704 | 5/2016 |
| CN | 105601406 | 5/2016 |
| CN | 105601408 | 5/2016 |
| CN | 105669257 | 6/2016 |
| CN | 105669324 | 6/2016 |
| CN | 105670643 | 6/2016 |
| CN | 105706601 | 6/2016 |
| CN | 105713619 | 6/2016 |
| CN | 105753516 | 7/2016 |
| CN | 105754609 | 7/2016 |
| CN | 105771898 | 7/2016 |
| CN | 105801283 | 7/2016 |
| CN | 105819921 | 8/2016 |
| CN | 105820002 | 8/2016 |
| CN | 105837382 | 8/2016 |
| CN | 105884448 | 8/2016 |
| CN | 105924322 | 9/2016 |
| CN | 105936611 | 9/2016 |
| CN | 105948945 | 9/2016 |
| CN | 105950166 | 9/2016 |
| CN | 105967940 | 9/2016 |
| CN | 105972602 | 9/2016 |
| CN | 106006602 | 10/2016 |
| CN | 106007831 | 10/2016 |
| CN | 106007916 | 10/2016 |
| CN | 106008097 | 10/2016 |
| CN | 106008106 | 10/2016 |
| CN | 106083234 | 11/2016 |
| CN | 106083461 | 11/2016 |
| CN | 106083462 | 11/2016 |
| CN | 106116934 | 11/2016 |
| CN | 106116935 | 11/2016 |
| CN | 106129359 | 11/2016 |
| CN | 106134957 | 11/2016 |
| CN | 106171884 | 12/2016 |
| CN | 106186625 | 12/2016 |
| CN | 106187449 | 12/2016 |
| CN | 106187451 | 12/2016 |
| CN | 106187579 | 12/2016 |
| CN | 106187643 | 12/2016 |
| CN | 106190141 | 12/2016 |
| CN | 106242701 | 12/2016 |
| CN | 106242911 | 12/2016 |
| CN | 106268635 | 1/2017 |
| CN | 106316544 | 1/2017 |
| CN | 106316706 | 1/2017 |
| CN | 106362685 | 2/2017 |
| CN | 106365852 | 2/2017 |
| CN | 106365880 | 2/2017 |
| CN | 106365893 | 2/2017 |
| CN | 106365917 | 2/2017 |
| CN | 106365928 | 2/2017 |
| CN | 106380348 | 2/2017 |
| CN | 106381150 | 2/2017 |
| CN | 106396809 A | 2/2017 |
| CN | 106396852 | 2/2017 |
| CN | 106396882 | 2/2017 |
| CN | 106423051 | 2/2017 |
| CN | 106431751 | 2/2017 |
| CN | 106433665 | 2/2017 |
| CN | 106465601 | 3/2017 |
| CN | 106475405 | 3/2017 |
| CN | 106478258 | 3/2017 |
| CN | 106478301 | 3/2017 |
| CN | 106489341 | 3/2017 |
| CN | 106495150 | 3/2017 |
| CN | 106495942 | 3/2017 |
| CN | 106518177 | 3/2017 |
| CN | 106518481 | 3/2017 |
| CN | 106518529 | 3/2017 |
| CN | 106518541 | 3/2017 |
| CN | 106573281 | 4/2017 |
| CN | 106631381 | 5/2017 |
| CN | 106631408 | 5/2017 |
| CN | 106631589 | 5/2017 |
| CN | 106635031 | 5/2017 |
| CN | 106635043 | 5/2017 |
| CN | 106636222 | 5/2017 |
| CN | 106673896 | 5/2017 |
| CN | 106699285 | 5/2017 |
| CN | 106699455 | 5/2017 |
| CN | 106747930 | 5/2017 |
| CN | 106748161 | 5/2017 |
| CN | 106748461 | 5/2017 |
| CN | 106748493 | 5/2017 |
| CN | 106748497 | 5/2017 |
| CN | 106748577 | 5/2017 |
| CN | 106824087 | 6/2017 |

(56) References Cited

FOREIGN PATENT DOCUMENTS

| | | |
|---|---|---|
| CN | 106831092 | 6/2017 |
| CN | 106831199 | 6/2017 |
| CN | 106833656 | 6/2017 |
| CN | 106881350 | 6/2017 |
| CN | 106883858 | 6/2017 |
| CN | 106893599 | 6/2017 |
| CN | 106916007 | 7/2017 |
| CN | 106939171 | 7/2017 |
| CN | 106946629 | 7/2017 |
| CN | 106947491 | 7/2017 |
| CN | 106967759 | 7/2017 |
| CN | 106978187 | 7/2017 |
| CN | 106995350 | 8/2017 |
| CN | 107011074 | 8/2017 |
| CN | 107011074 A | 8/2017 |
| CN | 107021714 | 8/2017 |
| CN | 107032860 | 8/2017 |
| CN | 107043110 | 8/2017 |
| CN | 107056487 | 8/2017 |
| CN | 107056496 | 8/2017 |
| CN | 107057707 | 8/2017 |
| CN | 107090296 | 8/2017 |
| CN | 107098329 | 8/2017 |
| CN | 107142112 | 9/2017 |
| CN | 107182607 | 9/2017 |
| CN | 107200627 | 9/2017 |
| CN | 107200640 | 9/2017 |
| CN | 107216225 | 9/2017 |
| CN | 107226758 | 10/2017 |
| CN | 107236548 | 10/2017 |
| CN | 107253711 | 10/2017 |
| CN | 107266163 | 10/2017 |
| CN | 107282625 | 10/2017 |
| CN | 107285846 | 10/2017 |
| CN | 107285899 | 10/2017 |
| CN | 107285964 | 10/2017 |
| CN | 107286944 | 10/2017 |
| CN | 107311787 | 11/2017 |
| CN | 107311794 | 11/2017 |
| CN | 107311816 | 11/2017 |
| CN | 107353086 | 11/2017 |
| CN | 107381966 | 11/2017 |
| CN | 107382529 | 11/2017 |
| CN | 107382588 | 11/2017 |
| CN | 107382630 | 11/2017 |
| CN | 107384411 | 11/2017 |
| CN | 107384415 | 11/2017 |
| CN | 107384429 | 11/2017 |
| CN | 107417414 | 12/2017 |
| CN | 107417470 | 12/2017 |
| CN | 107445680 | 12/2017 |
| CN | 107445700 | 12/2017 |
| CN | 107445701 | 12/2017 |
| CN | 107445769 | 12/2017 |
| CN | 107446585 | 12/2017 |
| CN | 107459025 | 12/2017 |
| CN | 107470324 | 12/2017 |
| CN | 107473833 | 12/2017 |
| CN | 107473869 | 12/2017 |
| CN | 107473883 | 12/2017 |
| CN | 107474848 | 12/2017 |
| CN | 107500265 | 12/2017 |
| CN | 107500832 | 12/2017 |
| CN | 107500911 | 12/2017 |
| CN | 107502357 | 12/2017 |
| CN | 107502370 | 12/2017 |
| CN | 107512947 | 12/2017 |
| CN | 107512948 | 12/2017 |
| CN | 107512974 | 12/2017 |
| CN | 107523302 | 12/2017 |
| CN | 107523561 | 12/2017 |
| CN | 107570522 | 1/2018 |
| CN | 107583942 | 1/2018 |
| CN | 107586190 | 1/2018 |
| CN | 107586205 | 1/2018 |
| CN | 107586220 | 1/2018 |
| CN | 107619341 | 1/2018 |
| CN | 107628738 | 1/2018 |
| CN | 107628916 | 1/2018 |
| CN | 107639106 | 1/2018 |
| CN | 107641010 | 1/2018 |
| CN | 107652981 | 2/2018 |
| CN | 107668086 | 2/2018 |
| CN | 107673927 | 2/2018 |
| CN | 107686403 | 2/2018 |
| CN | 107686432 | 2/2018 |
| CN | 107698316 | 2/2018 |
| CN | 107698334 | 2/2018 |
| CN | 107698370 | 2/2018 |
| CN | 107698387 | 2/2018 |
| CN | 107721624 | 2/2018 |
| CN | 107746352 | 3/2018 |
| CN | 107759322 | 3/2018 |
| CN | 107759398 | 3/2018 |
| CN | 107759420 | 3/2018 |
| CN | 107778087 | 3/2018 |
| CN | 107794050 | 3/2018 |
| CN | 107794052 | 3/2018 |
| CN | 107880894 | 4/2018 |
| CN | 107892929 | 4/2018 |
| CN | 107915551 | 4/2018 |
| CN | 107915553 | 4/2018 |
| CN | 107916108 | 4/2018 |
| CN | 107935640 | 4/2018 |
| CN | 107935671 | 4/2018 |
| CN | 107955614 | 4/2018 |
| CN | 107955616 | 4/2018 |
| CN | 107986825 | 5/2018 |
| CN | 108002895 | 5/2018 |
| CN | 108003881 | 5/2018 |
| CN | 108003884 | 5/2018 |
| CN | 108033814 | 5/2018 |
| CN | 108040565 | 5/2018 |
| CN | 108046941 | 5/2018 |
| CN | 108046955 | 5/2018 |
| CN | 108048100 | 5/2018 |
| CN | 108059578 | 5/2018 |
| CN | 108080403 | 5/2018 |
| CN | 108083251 | 5/2018 |
| CN | 108085010 | 5/2018 |
| CN | 108129237 | 6/2018 |
| CN | 108144580 | 6/2018 |
| CN | 108147916 | 6/2018 |
| CN | 108164358 | 6/2018 |
| CN | 108165276 | 6/2018 |
| CN | 108178682 | 6/2018 |
| CN | 108188162 | 6/2018 |
| CN | 108191548 | 6/2018 |
| CN | 108207467 | 6/2018 |
| CN | 108218565 | 6/2018 |
| CN | 108251118 | 7/2018 |
| CN | 108262022 | 7/2018 |
| CN | 108264401 | 7/2018 |
| CN | 108277013 | 7/2018 |
| CN | 108277016 | 7/2018 |
| CN | 108299119 | 7/2018 |
| CN | 108299120 | 7/2018 |
| CN | 108314480 | 7/2018 |
| CN | 108314513 | 7/2018 |
| CN | 108314524 | 7/2018 |
| CN | 108314591 | 7/2018 |
| CN | 108315015 | 7/2018 |
| CN | 108326023 | 7/2018 |
| CN | 108329105 | 7/2018 |
| CN | 108329153 | 7/2018 |
| CN | 108358729 | 8/2018 |
| CN | 108373376 | 8/2018 |
| CN | 108383661 | 8/2018 |
| CN | 108384553 | 8/2018 |
| CN | 108395334 | 8/2018 |
| CN | 108401823 | 8/2018 |
| CN | 108409407 | 8/2018 |
| CN | 108409417 | 8/2018 |
| CN | 108413400 | 8/2018 |

(56) References Cited

FOREIGN PATENT DOCUMENTS

| | | |
|---|---|---|
| CN | 108423959 | 8/2018 |
| CN | 108424226 | 8/2018 |
| CN | 108424277 | 8/2018 |
| CN | 108440089 | 8/2018 |
| CN | 108440093 | 8/2018 |
| CN | 108440163 | 8/2018 |
| CN | 108440207 | 8/2018 |
| CN | 108441222 | 8/2018 |
| CN | 108441227 | 8/2018 |
| CN | 108441231 | 8/2018 |
| CN | 108456106 | 8/2018 |
| CN | 108456111 | 8/2018 |
| CN | 108456113 | 8/2018 |
| CN | 108467310 | 8/2018 |
| CN | 108479352 | 9/2018 |
| CN | 108480396 | 9/2018 |
| CN | 108484286 | 9/2018 |
| CN | 108484286 A | 9/2018 |
| CN | 108484287 | 9/2018 |
| CN | 108484300 | 9/2018 |
| CN | 108485679 | 9/2018 |
| CN | 108503404 | 9/2018 |
| CN | 108503473 | 9/2018 |
| CN | 108513991 | 9/2018 |
| CN | 108515080 | 9/2018 |
| CN | 108516908 | 9/2018 |
| CN | 108516912 | 9/2018 |
| CN | 108516915 | 9/2018 |
| CN | 108530209 | 9/2018 |
| CN | 108570330 | 9/2018 |
| CN | 108575662 | 9/2018 |
| CN | 108585959 | 9/2018 |
| CN | 108586123 | 9/2018 |
| CN | 108586132 | 9/2018 |
| CN | 108586138 | 9/2018 |
| CN | 108623406 | 10/2018 |
| CN | 108624325 | 10/2018 |
| CN | 108640791 | 10/2018 |
| CN | 108641722 | 10/2018 |
| CN | 108675867 | 10/2018 |
| CN | 108689776 | 10/2018 |
| CN | 108707015 | 10/2018 |
| CN | 108707036 | 10/2018 |
| CN | 108727105 | 11/2018 |
| CN | 108728165 A | 11/2018 |
| CN | 108752095 | 11/2018 |
| CN | 108770616 | 11/2018 |
| CN | 108822879 | 11/2018 |
| CN | 108838204 | 11/2018 |
| CN | 108840753 | 11/2018 |
| CN | 108841398 | 11/2018 |
| CN | 108854950 | 11/2018 |
| CN | 108862972 | 11/2018 |
| CN | 108863669 | 11/2018 |
| CN | 108863679 | 11/2018 |
| CN | 108865157 | 11/2018 |
| CN | 108910875 | 11/2018 |
| CN | 108911840 | 11/2018 |
| CN | 108911877 | 11/2018 |
| CN | 108927109 | 12/2018 |
| CN | 108929700 | 12/2018 |
| CN | 108949180 | 12/2018 |
| CN | 108949185 | 12/2018 |
| CN | 108975647 | 12/2018 |
| CN | 108976016 | 12/2018 |
| CN | 108976078 | 12/2018 |
| CN | 108997059 | 12/2018 |
| CN | 109020705 | 12/2018 |
| CN | 109020711 | 12/2018 |
| CN | 109020724 | 12/2018 |
| CN | 109020747 | 12/2018 |
| CN | 109053313 | 12/2018 |
| CN | 109054848 | 12/2018 |
| CN | 109089809 | 12/2018 |
| CN | 109096014 | 12/2018 |
| CN | 109096017 | 12/2018 |
| CN | 109111309 | 1/2019 |
| CN | 109134136 | 1/2019 |
| CN | 109168397 | 1/2019 |
| CN | 109174000 | 1/2019 |
| CN | 109181704 | 1/2019 |
| CN | 109181706 | 1/2019 |
| CN | 109206276 | 1/2019 |
| CN | 109232048 | 1/2019 |
| CN | 109232082 | 1/2019 |
| CN | 109279959 | 1/2019 |
| CN | 109279959 A | 1/2019 |
| CN | 109279969 | 1/2019 |
| CN | 109279971 | 1/2019 |
| CN | 109289700 | 2/2019 |
| CN | 109354546 | 2/2019 |
| CN | 109354556 | 2/2019 |
| CN | 109365506 | 2/2019 |
| CN | 109369241 | 2/2019 |
| CN | 109369269 | 2/2019 |
| CN | 109369285 | 2/2019 |
| CN | 109396166 | 3/2019 |
| CN | 109400385 | 3/2019 |
| CN | 109400389 | 3/2019 |
| CN | 109438028 | 3/2019 |
| CN | 109438098 | 3/2019 |
| CN | 109438102 | 3/2019 |
| CN | 109438126 | 3/2019 |
| CN | 109482630 | 3/2019 |
| CN | 109485470 | 3/2019 |
| CN | 109485504 | 3/2019 |
| CN | 109485509 | 3/2019 |
| CN | 109485524 | 3/2019 |
| CN | 109486497 | 3/2019 |
| CN | 109503286 | 3/2019 |
| CN | 109516882 | 3/2019 |
| CN | 109529767 | 3/2019 |
| CN | 109530423 | 3/2019 |
| JP | 02111683 | 4/1990 |
| JP | 2005239906 A | 9/2005 |
| JP | 2013006754 A | 1/2013 |
| JP | 2018510832 A | 4/2018 |
| WO | 2010129988 | 11/2010 |
| WO | 2010129988 A1 | 11/2010 |
| WO | 2016144930 | 9/2016 |
| WO | 2016155389 | 10/2016 |
| WO | 2017011912 | 1/2017 |
| WO | 2017128943 | 8/2017 |
| WO | 2017133079 | 8/2017 |
| WO | 2017147979 | 9/2017 |
| WO | 2018011007 | 1/2018 |
| WO | 2019052738 | 3/2019 |
| WO | 2019066638 | 4/2019 |

OTHER PUBLICATIONS

Office Action dated Mar. 23, 2021 for U.S. Appl. No. 17/137,951.
Simons, et al., Indigenous Bone Fertilizer for Food Security and Growth, retrieved from internet on Aug. 24, 2020; URL:http://www.andrewmsimons.com/wp-content/uploads/2018/08/20/2018-07-27-Indigenous-Bone-Fertilizer-with-Figures-Tables.pdf; published Aug. 2018, pp. 5-7.
Crombie, et al., "Biochar—Synergies and Trade-Offs Between Soil Enhancing Properties and C Sequestration Potential", GCB Bioenergy, 7, 2015, 1161-1175.
Cross, et al., "The Priming Potential of Biochar Products in Relation to Labile Carbon Contents and Soil Organic Matter Status", Soil Biology and Biochemistry, 43, 2011, 2127-2134.
European examination report dated Sep. 9, 2022 in European patent application No. 20834784.9 (8 pages).

\* cited by examiner

|   | USE | C | N | P | K | S | CA |
|---|---|---|---|---|---|---|---|
| A | General cropping & pasture | 25.7 | 5.5 | 5.3 | 0.9 | 3.1 | 9.5 |
| B | General cropping & pasture | 25.3 | 5.9 | 5.6 | 0.9 | 3.2 | 9.5 |
| C | General cropping & pasture | 24 | 6.15 | 5.8 | 0.9 | 3.22 | 9.51 |
| D | Organic production | 22.3 | 2 | 4.4 | 9 | 3.8 | 17.5 |
| E | Beef & sheep pasture | 22.3 | 2 | 8 | 0.8 | 10.6 | 14.2 |
| F | Vegetable and tree crop production | 15.3 | 11.2 | 4 | 10.8 | 9.5 | 10.1 |
| G | Vegetable and tree crop production | 15.3 | 11.9 | 4.7 | 11.3 | 5.5 | 9 |
| H | Vegetable and tree crop production | 15.3 | 9.7 | 1.7 | 11.3 | 8.9 | 9 |
| I | Vegetable and tree crop production | 15.3 | 9.6 | 4.7 | 10.6 | 5.9 | 8.5 |
| J | Vegetable and tree crop production | 15.3 | 9.1 | 9.2 | 10.1 | 1.1 | 8.1 |
| K | Grains | 14.4 | 9.8 | 10.2 | 0.5 | 5.7 | 1.8 |
| L | Grains | 14.4 | 12.87 | 13.4 | 0.54 | 1.366 | 1.758 |
| M | Enhanced efficiency nitrogen | 14.4 | 14.79 | 0.6 | 0.54 | 15.766 | 1.758 |
|   |   | C | N | P | K | S | CA |
|   | Max | 25.7 | 14.79 | 13.4 | 11.3 | 15.766 | 17.5 |
|   | Min | 14.4 | 2 | 0.6 | 0.5 | 1.1 | 1.758 |

*Figure 1*

Table 1 - Organic Material (Post Torrefaction)

| | N % | P % | K % | S % | Total Organic Carbon % | Moisture Content % | E.Coli MPN/g | Salmonella per 50g | Listeria per 50g | Total Coliforms MPN/g |
|---|---|---|---|---|---|---|---|---|---|---|
| Torrefied Organic Mix (Chicken litter 50%, chicken manure 40%, leonardite 10%) | 4.2 | 1.5 | 2.8 | 0.9 | 35.3 | 10.5 | <3 | Not Detected | Not Detected | <3 |
| Torrefied Organic Mix (Chicken litter 52%, chicken manure 32%, leonardite 16%) | 4.0 | 1.3 | 2.8 | 0.8 | 37.4 | 3.87 | <3 | Not Detected | Not Detected | <3 |
| Torrefied Organic Mix (Wood shavings 100%) | 2.2 | 1.1 | 2.2 | 0.8 | 40.7 | 0.587 | <3 | Not Detected | Not Detected | <3 |

*Figure 7*

Table 4 - Formation and Nutrient Content of Different Torrefied Organic Bases

| | Torrefied Organic Base Chicken Litter (Sawdust) 52%, Chicken Manure 32%, Leonardite 16%) | Torrefied Organic Base Chicken Litter 50%, Chicken Manure 40%, Leonardite 10%) | Torrefied Organic Base Chicken Litter 50%, Chicken Manure 40%) | Torrefied Organic Base Chicken Litter (Straw) 52%, Chicken Manure 32%, Leonardite 16%) |
|---|---|---|---|---|
| N% | 2.91 | 4.16 | 2.85 | 4.02 |
| P% | 1.18 | 1.49 | 1.52 | 1.29 |
| K% | 2.56 | 2.75 | 2.91 | 2.75 |
| S% | 1.21 | 0.93 | 0.72 | 0.84 |
| Organic C% | 32.80 | 35.30 | 31.00 | 37.40 |

*Figure 8*

Table 5 - Expected & Measured Nutrient Content (B1)

| Nutrient Content | Expected B1 | B1(Replicate 1) | B1(Replicate 2) |
|---|---|---|---|
| N% | 12.37 | 11.60 | 12.20 |
| P% | 12.76 | 13.70 | 13.90 |
| K% | 0.81 | 1.09 | 1.19 |
| S% | 1.22 | 1.89 | 1.79 |
| C% | 12.79 | 11.00 | 11.90 |

*Figure 10*

*Table 6 - Torrefied Organic Base recipe*

|  | Fraction in Base recipe |
|---|---|
| Chicken Litter | 59% |
| Chicken Manure | 40% |
| Chicken Mortalities (Carcasses) | 1% |

*Figure 12*

| | Product | B2 | B3 | B4 | B5 | B6 | B7 | C1 | D1 | D5 |
|---|---|---|---|---|---|---|---|---|---|---|
| Ingredients (Dry %) | Torrefied Organic Base | 32.5 | 32.5 | 32.5 | 32.5 | 32.5 | 32.5 | 90 | 32.5 | 32.5 |
| | 59% litter, 40% manure, 1% chicken mortalities | 6 | 6 | 6 | 6 | 6 | 6 | 10 | 6 | 6 |
| | Leonardite | - | - | - | - | - | - | - | - | - |
| | Sulphur Bentonite | - | - | - | - | - | - | - | - | - |
| | Triple Superphosphate | - | - | - | - | - | - | - | - | - |
| | Reactive Phosphate Rock | - | - | - | - | - | 23.5 | - | - | - |
| | SOP | - | - | - | 42.5 | 5 | 16.5 | - | - | - |
| | DAP | - | - | 20 | 19 | 21.5 | 21.5 | - | - | - |
| | MOP | - | - | 20 | - | - | - | - | - | - |
| | CAN (Calcium Ammonium Nitrate) | - | - | - | - | - | - | - | 61.5 | 40.3 |
| | Urea | - | - | - | - | - | - | - | - | - |
| | Granulock Z | - | 42.5 | - | - | - | - | - | - | - |
| | MAP | - | - | - | - | - | - | - | - | - |
| | SOA | 61.5 | 18.4 | 21.5 | - | 35 | - | - | - | - |
| | ZnO | - | 0.6 | - | - | - | - | - | - | 0.7 |
| | Agrisilica | - | - | - | - | - | - | - | - | 20.3 |
| | DMP (Inhibitor) | - | - | - | - | - | - | - | - | 0.2 |
| Nominal Analysis (%) | Nitrogen | 14.2 | 9.4 | 9.4 | 9 | 9.6 | 10.1 | 3.6 | 29.6 | 19.8 |
| | Phosphorus | 0.5 | 9.8 | 4.5 | 9 | 1.5 | 3.8 | 1.3 | 0.5 | 0.5 |
| | Potassium | 0.8 | 0.8 | 10.8 | 10.3 | 11.6 | 10.4 | 2.2 | 0.8 | 0.8 |
| | Sulphur | 15.1 | 5.4 | 5.8 | 0.9 | 8.8 | 9.5 | 0.8 | 0.3 | 0.6 |
| | Carbon | 12.8 | 12.8 | 12.8 | 12.8 | 12.8 | 12.8 | 32.4 | 27.6 | 22.5 |
| | Calcium | 3 | 3 | 3 | 3 | 3 | 12.4 | 8.3 | 3 | 3.3 |

Figure 13

FERTILISER

This application is a continuation of U.S. patent application Ser. No. 17/137,951 filed Dec. 30, 2020 and entitled "IMPROVED FERTILISER," which is a continuation of international patent application no. PCT/AU2020/050701 filed Jul. 3, 2020 and entitled "IMPROVED FERTILISER," which in turn claims priority to AU2020900981 filed Mar. 31, 2020 and AU2019902376 filed Jul. 4, 2019, the entire contents of each of which are hereby incorporated by reference herein in its entirety.

TECHNICAL FIELD

The present invention relates to an improved fertiliser.

BACKGROUND

Organic fertilisers comprise mainly plant and or animal based materials. The materials can be, for example, manure, carcasses, food waste, organic industrial waste and green litter. Organic and/or carbon based fertilisers tend to be beneficial to the soil including improving the structure of the soil, stimulating microbial activity and or gradual release of all essential nutrients to the soil.

Inorganic fertilisers contain minerals and sometimes synthetic chemicals such as those derived from natural and/or synthetic hydrocarbons and atmospheric nitrogen. Inorganic fertilisers can include the main nutrients that plants need to grow and survive such as nitrogen N, potassium K and phosphorus P. Nutrients from inorganic fertilisers can leach in the soil and may affect microbial colonies in the application zone. For this and other reasons, inorganic fertilisers are best used together with organic fertilisers at least to maintain soil health.

Organic fertilisers tend to be bulky with a consistency like mulch. Inorganic fertilisers come in different forms such as dry powders or pellets (granules, prills, pastelles) or liquids including soluble solutions. The nutrients in an organic fertiliser tend to be released slowly over time, which can mean that the amount and number of times that the organic fertiliser is required to be applied to soil can vary over a given time period. Inorganic nutrients are typically immediately available to the plant. Over fertilisation with inorganic fertilisers or incorrect placement or application technique can increase the risk that the concentration of nutrients will damage the plant, especially germinating or immature plants.

Typically, organic fertilisers, at least those comprising carcasses/waste, should be handled with care, given that, in some instances, the organic fertiliser can be colonised by pathogenic microbes that can be harmful to humans and grazing animals.

Due to the inherent differences in consistency, safety-requirements and soil activity, organic and inorganic fertilisers are typically applied to soils in two separate application processes. Sometimes, different machinery is required to apply each of the organic and inorganic fertiliser types. The timing of applications may also need to be different for each of the fertiliser types.

There is a need for an improved fertiliser formulation which overcomes or at least ameliorates some of the disadvantages of fertilisers of the prior art.

It is to be understood that, if any prior art is referred to herein, such reference does not constitute an admission that the publication forms a part of the common general knowledge in the art, in Australia or any other country.

SUMMARY OF THE INVENTION

In a first aspect there is provided a dry and solid fertiliser in the form of discreet particles, wherein particles of the dry and solid fertiliser comprise a homogenous mixture of organic and inorganic materials, the inorganic material comprising at least one of the NPKS nutrients, and the organic material comprising a carbon-labile substantially sterile product of organic waste.

In a second aspect there is provided a method of preparing a dry and solid fertiliser in the form of discreet particles, the method comprising the steps of:
  sterilising an organic waste material to provide a carbon-labile and substantially sterile product;
  mixing an inorganic material comprising at least one of NPKS with the substantially sterile product to produce a mixed product;
  binding the mixed product to provide a homogenous mixture of organic and inorganic materials; and
  forming the homogenous mixture of organic and inorganic materials into discreet particles.

In some embodiments, the binding and the mixing steps occur concurrently.

By "homogenous mixture of organic and inorganic materials" in the fertiliser it is meant that the fertiliser comprises the two materials mixed and substantially bound together. The materials do not have to be chemically bound together but they are at least physically bound together. The fertiliser is not intended to include those with an organic fertiliser applied in one stage, and an inorganic fertiliser applied in a second stage. This would be a heterogeneous mixture of the two and would provide less advantages than the present invention. An advantage of the dry and solid fertiliser is that the organic and inorganic fertiliser materials can be applied together in one step using existing application equipment. This represents a significant cost and time saving.

The organic waste can be referred to as biosolids. The organic waste is preferably animal waste. The animal waste can be anything derived from an animal that is typically discarded or considered of little value for further processing. The waste can include manure from the animal, carcasses, or other materials used by (e.g. bedding) shed from the animal (e.g. hair, skin, body parts). The waste can include litter. The litter can be a mixture of poultry excreta, spilled feed, body parts e.g. feathers, and material used as bedding in farming operations. The litter can also include unused bedding materials. In some embodiments, the organic waste is green waste. Green waste can include agricultural wastes such as hay (possibly damaged waste hay) or other agricultural biosolids. The organic waste subject to the present method or in the present fertiliser can be mixtures of different types of biosolids. In some embodiments, animal waste comprises at least about 25, 30, 40, 50, 60, 70, 80, 90 or 100 wt % of the organic component of the fertiliser composition.

In an embodiment, the animal waste is chicken waste. The waste can comprise chicken carcasses and or chicken manure and or chicken litter. Chicken waste or poultry litter represents a significant waste stream in some countries. In an embodiment, the animal waste is pig waste. The waste can comprise pig carcasses and or pig manure and or pig litter. In an embodiment, the animal waste is cattle waste. The waste can comprise cattle carcasses and or cattle manure and or cattle litter. The animal can be any other animal that produces waste. In embodiments, the present invention may provide a method for utilising that waste stream into a recycled and commercially valuable product. The percentages of the various waste of the animal can vary as described herein. Preferably, the waste is not too moist so there may be advantages to using more litter and less manure in the feed stream. One of the limitations for the direct application of organic waste to soil is the presence of pathogenic microorganisms. For example, animal waste can contain microscopic fungi such as fusarium genera, apergillus and or penicillium. Most fusarium fungi are phytotrophs. *Aspergillus* and penicillium form toxins in soil. A variety of pathogens can be found in chicken litter or chicken litter-based organic fertilizers, such as *Actinobacillus, Bordetalla, Campylobacter, Clostridium, Corynebacterium, Escherichia coli, Globicatella, Listeria, Mycobacterium, Salmonella, Staphylococcus*, and *Streptococcus*. *Listeria* and *Salmonella* are known to cause fatalities. The fertiliser described herein is a substantially sterile product of organic waste. By substantially sterile, it is meant that that pathogens tend not to be present in the fertiliser immediately prior to use. Since it is substantially sterile, the fertiliser is therefore safer to handle than a fertiliser that is not sterile. *Listeria* infection can lead to unplanned abortions in pregnant women or death of newborn babies. *Salmonella, Campylobacter*, and Enterohaemorrhagic *Escherichia coli* are among the most common foodborne pathogens that affect millions of people annually—sometimes with severe and fatal outcomes. It should be understood, that pathogens including bacteria, fungi and yeasts, etc., are present in the air and will inevitably contaminate any material not isolated or otherwise protected. Accordingly, there may be some pathogens present in the fertiliser product, but these would not be in the same number as would otherwise be present absent any sterilisation process.

In order to sterilise the material, chemical, thermal and or physical methods can be employed. The organic matter of the present fertiliser is preferably subjected to a thermal sterilisation process. It should be understood that other sterilisation processes in addition to thermal sterilisation can be applied. The sterilisation process preferably subjects the organic waste to a temperature sufficient to reduce or eliminate pathogens in the waste. The sterilisation process is to reduce or eliminate the pathogens and may also reduce the moisture content of the organic waste to a point where further microorganism growth is inhibited. This reduction in moisture content may be important for storage and transportation of the organic part of the fertiliser until the point of use when applied to the soil. In embodiments, the sterilisation process can reduce the moisture content to a total water content by weight of at most about 1, 2, 5, 10 or 15 wt %.

During the thermal sterilisation process, steam and other volatile gases can be flashed off, captured and or condensed in a gas cleaning system. There is thought be low nutrient loss from the bulk solid to the condensed vapours. Non-condensable vapours can be sent to atmosphere through a final filtration process. The condensate can be stored on site and optionally recycled back through the process (as a wetting agent) or disposed of. In an embodiment, the condensate is employed in the granulation stage of the process as described further below. The condensate has potential to have other nutrients added (e.g. APP and or urea) to then be sold as a liquid fertiliser.

In an embodiment, in order to effect sterilisation, the organic material is subjected to a pyrolysis. Preferably, the pyrolysis is a torrefaction of the organic material.

Pyrolysis is the thermal decomposition of materials at elevated temperatures in an inert (anaerobic) atmosphere. Pyrolysis of organic materials requires control/elimination of oxygen to avoid partial or complete oxidation (burning).

Pyrolysis of organic materials occurs in temperature ranges and typically results in different end products. Pyrolysis begins at about 250 degrees C. and charring at about 400 degrees C. for many natural organics. At the lowest end, composting occurs between 40 degrees C. to 80 degrees C. Torrefaction typically occurs between 150 degrees C. and 350 degrees C. Biochar is usually produced above ~750 degrees C. Typically, char becomes more surface active at temperatures above 600 degrees C. Biochars prepared at very high temperatures e.g. >600-700 degrees C. may not be useful at least for agriculture use. Some biochars prepared at around 450-500 degrees C. can provide relatively good results for agricultural use. The present method preferably applies a temperature at which torrefaction occurs, so the organic waste becomes a torrefied product.

Torrefaction is thought to be a suitable process technology for the preparation of the present fertiliser, because it can 'activate' the organic material at a temperature low enough to prevent evolution of more difficult volatile materials (e.g. tars). Activation is the process of changing the underlying carbon matrix. After torrefaction (~350 degrees C.), the carbon of the organic waste tends to become more brittle and is relatively easier to grind and compact. The torrefied product has a cellular structure that is similar, but not the same as biochar. Preferably, the present process does not subject the organic waste to temperatures that result in biochar.

Upon application of the dry and solid fertiliser to the soil, the bacteria present in the soil are able to commence metabolising the carbon of the organic material. The organic material is carbon rich. The carbon of the fertiliser is labile. By labile it is meant that the carbon is bioavailable to micro-organisms in the soil matrix. Another example of a carbon-rich material is biochar; however, the carbon of biochar tends not to be labile. Biochar is therefore not (as) useful in the fertiliser of the present invention, since the microorganisms are less able to use the carbon. Biochar may represent firstly a sequestering medium for preventing carbon from re-entering the atmosphere and secondly a slow release composition for use in planting seeds. The torrefied structure that results from the present method is preferably helpful for soil health as it may provide a high-surface area porous medium for beneficial microbial growth, water and nutrient storage. The present fertiliser may provide a simultaneous supply of nutrients and compost; nutrients in a form that are sustained release and less likely to cause germination/seedling damage issues but in embodiments, still more rapid and predictable in release than traditional manures and composts.

The nutrients in the fertiliser include at least one of nitrogen (N), phosphorous (P), Potassium (K) and sulphur (S). The nutrients can be NPKS (i.e. all of the 4). The nutrients can be one or more of NPKS. Additional inorganic nutrients can be added to the organic material once it has been subjected to the sterilisation process. It should be understood that the organic material also contains some nutrients, but a desired and consistent, stable and precise nutrient content is achieved by the addition of the inorganic fertiliser after the sterilisation of the organic component The method for forming the fertiliser can comprise the step of mixing inorganic materials comprising at least one of NPKS with the substantially sterile organic product to produce a mixed product. This is typically done after the organic component has been subjected to the sterilisation process, however it can be done before in some cases. There is no need to heat treat the inorganic fertiliser ingredients as they will tend to be sterile already due to their high salt and/or ammonium content and the heat/pressure associated with their manufacturing process. Further argument for adding the inorganic material after is that certain temperatures may chemically alter the inorganic material fertilisers or melt them in the form provided.

The mixing can be done after each of the organic and inorganic materials have been milled. Alternatively, the mixing can be done before each of the organic and inorganic material have been milled so that they are milled together. In some embodiments, there are advantages to milling the materials together because there may be fewer blockages in the mill and reduced overgrinding of the torrefied base. In order to mix the two materials, the mixing can be performed by the following process:

The organic ingredients are heat treated (torrefied).
The organic ingredient is mixed with the inorganic fertiliser (and other minerals e.g. reactive rock phosphate and a binding agent). The organic/inorganic mixture is then milled.
The blended organic and inorganic composition can then be subjected to compaction to form discrete particles. This could be any form including granulation, extrusion or pelleting. This process does not necessarily involve external heat but there could be heat due to shear from mixing. In some embodiments, steam or hot water can be used to aid granulation. It is at this step that the recycled condensate could be used.
The granules can be subjected to polishing to achieve spherical shape (free from irregular and sharp edges) and consistent size. Polishing typically requires application of liquid in the form of spray.
The polished granules can then subjected to thermal drying to ensure the additional moisture is dried off and the granules are biologically inactive for storage and handling purposes. The dried granules will also have better hardness for handling endurance in fertiliser application equipment.

Some moisture is required to form the granules. If there is too little moisture the product will be dusty. If the moisture content is too high, there can be an increased tendency for pathogens to grow in the product. The moisture content can be reduced by selecting a drier blend of organic mixture for torrefaction. The moisture content of the final granules is, in a preferred embodiment, less than 5 wt % but greater than 1 wt %. In order to reach this moisture level, the drying period and or the drying temperature in the thermal drying step can be adjusted. Alternatively, the granules can be subject to more than one drying cycle, The moisture content of the improved fertiliser granules has an effect on the crush strength (hardness). The crush strength decreases as the moisture content increases. In an embodiment, the crush strength is at least about 2.5, 3 or 3.5 KgF which is comparable to e.g. granules of urea. The particles of improved fertiliser are also similarly sized to urea granules being in the range of from about 2 to about 5 mm in average diameter. In order to reduce any tendency to absorb water, which might affect the resultant crush strength, the particles can be coated. The coating can be a known coating that reduces the hydroscopic nature of the particles.

In the present fertiliser, inorganic nutrients are added in an attempt to control the amount of nutrients available in the soil. The amount of nutrient added can be determined based on the final intended use of the fertiliser. In some embodiments, the skilled person will perform experiments on the soil to which the fertiliser will be applied. The results of the experiments will reveal which nutrients would be best for the target soil. Alternatively, nutrient requirements may be determined by soil and/or plant tissue analyses.

The nutrients are preferably slow release with at most about 15, 25, 30, 45 or 50% of the N and P becoming available in about the first 1, 2, or 3 months and the remainder being available over subsequent 1 to 3, to 12 to 18 months. In an embodiment over 1 to 12 months. In an embodiment, 50% of the N and P is available over the first month and remainder becomes available over the next 1-4 months. Without wishing to be bound by theory, it is thought that most of the available nutrients are initially used by the microbes in the soil, and these nutrients are released upon death and decay of the native microbial population. The microbes cease to thrive once the carbon material of the fertiliser is used up as a food source. By using an organic matrix together with inorganic nutrients, a higher load of nitrogen may be able to be loaded into the dry and solid fertiliser. Usually, a large concentration of fertiliser salts and or ammonium nitrogen in proximity to a germinating seed or immature plant in soil will be detrimental to the plant. However, if there is sufficient organic matter in the surrounding soil environment to bind ammonium nitrogen and other salts this problem may be avoided or at least reduced. The nitrogen then becomes available to the plant later, as the microbes use the carbon as an energy source and ammonium as a protein building block. The amount of ammonium nitrogen in the fertiliser can be at least about 1, 2, 5, 10, 12 or 15% w/w.

The nitrogen N added to the organic material can be in the form of one or more of (but not limited to):
Ammonium Sulphate
Urea
Ammonium Chloride
Ammonium Nitrate
Anhydrous Ammonia
Urea Ammonium Nitrate
Calcium Ammonium Nitrate
Potassium Nitrate
Calcium Nitrate The percentage of total nitrogen in the fertiliser can be at least about 0, 10, 20 or 30% w/w. In an embodiment, assuming a minimum of 30% organic material, total N maximum would be limited to around 30% w/w.

In some embodiments, the combination of the inorganic material and organic matter can provide for a potentially explosive combination. In order to reduce the chance that the fertiliser will be combustible, steps can be taken. The steps can include the addition of an explosion retardant. The explosion retardant can be diammonium phosphate (DAP).

The phosphorous P added to the organic material can be in the form of one or more of (but not limited to):
Superphosphate
Bone meal
Rock phosphate
Diammonium Phosphate
Monoammonium Phosphate
Triple superphosphate
Phosphoric acid.

The percentage of total phosphorous in the fertiliser can be at least about 0.5 to about 15% w/w.

The potassium K added to the organic material can be in the form of one or more of (but not limited to):
Potassium Chloride (Muriate of Potash)
Potassium Sulphate
Potassium Schoenite
Potassium Nitrate
Potash derived from Molasses The percentage of total potassium in the fertiliser can be at least about 0.5 to about 12% w/w.

The sulphur S added to the organic material can be in the form of one or more of (but not limited to):

Sulphur powder
Sulphur (granular)
Sulphur bentonite
Ammonium sulphate

The percentage of total sulphur in the fertiliser can be at least about 1 to about 16% w/w.

The formulation can comprise at least one of NPKS which means it can contain N and or P and or K and or S. the formulation can comprise all four of the NPKS, or is can contain less than all four of the NPKS nutrient. Not every formulation will contain inorganic forms of each of NPKS e.g. some may only contain N in the inorganic form. Combination additives can also be used including one or more of but not limited to diammonium phosphate, ammonium phosphate sulphate, urea ammonium phosphate, mono ammonium phosphate, ammonium nitrate phosphate, ammonium phosphate, NPK. In addition to the inorganic nutrients listed, the fertilizer can comprise micronutrients including zinc, copper, iron, manganese, boron, molybdenum and secondary nutrients calcium, magnesium and silicon. The percentage of secondary nutrients such as calcium in the fertiliser can be at least about 0.5 to about 18% w/w. The percentage of micronutrients in the fertiliser can be at least about 0.01 to about 2% w/w.

There can be other additives in the composition that do not necessarily provide nutritional benefits, but instead impart other functional improvements. In embodiments, there are additives to increase the mechanical properties of the final product. In embodiments, the formulation includes one or more nitrification inhibitors. Fertiliser nitrogen is inefficiently used in many agricultural soils as plant available nitrate nitrogen is subject to leaching and denitrification losses. One method of reducing such losses is to stabilise nitrogen fertilisers with nitrification inhibitors. This is done by treating the soil (via the fertiliser) with compounds that inhibit the activity of nitrifying bacteria so that nitrogen remains in the more stable ammonium form for an extended period. An example of a nitrification inhibitor is dimethylpyrazole (DMP). This provides a drip feed of nitrate nitrogen offsetting loss events. It is noted that the performance of nitrification inhibitors is variable in Australian soils for a variety of reasons. Plants can also extract ammonium nitrogen from the soil although high concentrations of ammonium and related ammonia can be toxic to plants. It is known that this toxicity can be reduced by the presence of vitamin B6 which is present in animal waste and was detected at trace levels in the finished product. There is also some evidence that zinc oxide can inhibit nitrification while zinc is also an essential micronutrient that is low or deficient in many Australia soils. Accordingly, in some embodiment Zinc is added to the formulation.

Further, field crops are regularly exposed to other abiotic stresses including drought and salinity. Plant available silicon is recognised as an element that can help plants cope with abiotic stresses—in addition, silicon is also a structural building block of plant cell walls. Certain crops like sugar cane and rice have high silicon demand and are often grown on soils or in regions where plant available silicon is depleted. It is thought that an efficient way of supplying nitrogen to plants will be to combine inorganic and organic sources of nitrogen combined with inhibitors that regulate release of nitrogen and with abiotic stress controllers that help plants offset deleterious environmental or chemical factors.

In embodiments, the ratio of organic material to inorganic material is 90:10, 80:20, 70:30, 60:40, 50:50, 45:55, 40:60, 32.5:67.5 or 30:70. In an embodiment, the base recipe comprises 45% organic and 55% inorganic material (referred to herein as A base, sometimes alongside a number which is an internal reference e.g. A1), or 32.5% organic and 67.5% inorganic material (can be referred to as B base sometimes alongside a number which is an internal reference e.g. B1, B2, B3 and so on); or 30% organic and 70% inorganic material (can be referred to as E base sometimes alongside a number which is an internal reference e.g. E1).

In an embodiment, the organic material is torrefied with a binder. The binder precursor can be added with the organic material and then delivered to the torrefier. In an embodiment, the organic material is torrefied and then the binder is added post-torrefaction. The binder can be leonardite. The binder can be calcium lignosulphate (CaLigno). Leonardite may be used to condition soils either by applying it directly to the land, or by providing a source of humic acid or potassium humate for application. The carbon geosequestration potential of Leonardite, particularly to rapidly accelerate microbial action to lock up and retain carbon in soils, provides the basis for extensive research on the organic fertilising aspect of brown coal.

The leonardite can be present in an amount of at least about 1, 5 or 10% w/w/ of the fertiliser composition. Potentially mixing leonardite with chicken manure will generate material with similar properties to calcium lignosulphonate which is widely used as a binding agent. Leonardite is also recognised as a valuable source of humic acid which is a soil conditioner used widely in a variety of farming systems aimed at improving nutrient retention in the soil and also plant uptake of certain nutrients like phosphate. Functional carbon groups supplied by leonardite mixed with other torrefied organic waste may improve plant phosphorus uptake, potentially providing a more efficient phosphorus fertiliser.

In an embodiment, the activity of the microbial population in the soil can be monitored. Most microbes produce by-products such as carbonaceous products or gases, which can be used as an indicator of soil-microbial activity. If the microbes are very active, then it can be deduced that the nutrient content of the soil is not yet at high thresholds that would damage germinating plants, and so seeds can be planted. If the microbes are less active, this may indicate that the population is in decline and the inorganic nutrients are about to be liberated by the mineralisation process. Where this is the case, and it is not desirable that microbial populations yet decline (e.g. the plant may not be mature enough, seeds may yet need to be planted, or some other reason) it may be advisable to increase the microbial population. It may be possible to increase the microbial population by adding more carbon labile fertiliser to the soil. Accordingly, the soil testing can also be used to determine optimum fertiliser dosing over time and location.

As discussed, the method includes the step of forming the homogenous mixture of organic and inorganic materials into discreet particles. The dry and solid fertiliser can comprise fines, granules, pellets or prills. The discrete particles in any form can have a size a mean average diameter of at least about 1, 2, 3, 4, 5, 6, 7, 8, 9 or 10 mm. In embodiments, at least about 80, 90, 95 or 100% of the discrete particles fall within 1 standard deviation of the mean particle size (ideally >80, 85 or 90% are in the range of from about 2 to about 5 mm range). Granules, like pellets, are small aggregates of a powdered material. Granules tend to disintegrate less quickly than pellets, tend to create less dust and in embodiments allow the binding together of multiple products that are then uniformly distributed through the granule. By uniformly distributed, it is meant that at any one location in a particle of the fertiliser, the relative amounts of inorganic and organic material are about the same as at any other location. Granules are also more aerodynamic when applied through broadcasting machinery and therefore a wider swath can be achieved. In a preferred embodiment, pelletisation is used to prepare the granules.

The fertiliser is described as a dry solid. By dry and solid, it is meant that the material can be handled in the form of pellets (granules). For example, the material can be loaded into a truck and transported and then applied using equipment designed for the controlled dosing of pelletised material. One or more of the components used to form the fertiliser may be liquid.

The method can also include the step of applying the fertiliser. The fertiliser can be applied at rates of at least about 0.05 to about 5 tonnes/hectare. In some embodiments, the fertiliser can increase the yield of crops by 2, 20, 50, or 100%. The ripening of crop can be brought forward by at least 5, 8, or 10% of the time taken without fertiliser. In some embodiments, the fertiliser can be used in the remediation of land comprising soil that is otherwise unsuitable for crops. The carbon-labile nature of the fertiliser can stimulate microbial communities to consume and proliferate, but then die and decay as the food source is depleted. As the bacteria die, the soil can be remediated by release of nutrients in which it was otherwise deficient. Leonardite can be added directly to soils to reduce the take-up of metals by plants in contaminated ground, particularly when combined with compost)

BRIEF DESCRIPTION OF THE FIGURES

Embodiments of the invention will now be described with reference to the accompanying drawings which are not drawn to scale and which are exemplary only and in which:

FIG. 1 is a table showing proposed fertiliser formulations and their organic and inorganic content in terms of percentage.

FIG. 7 is Table 1 showing the % breakdown of the organic material (post-torrefaction) including pathogen testing results.

FIG. 8 is Table 4 showing formulation and nutrient content of different torrefied organic bases.

FIG. 10 is Table 5 showing expected and measured nutrient content of sample B1.

FIG. 12 is Table 6 showing an example of a torrefied organic base recipe.

FIG. 13 is a table showing the composition of fertilisers according to embodiments of the invention.

DETAILED DESCRIPTION OF EMBODIMENTS OF THE INVENTION

Figure 2:
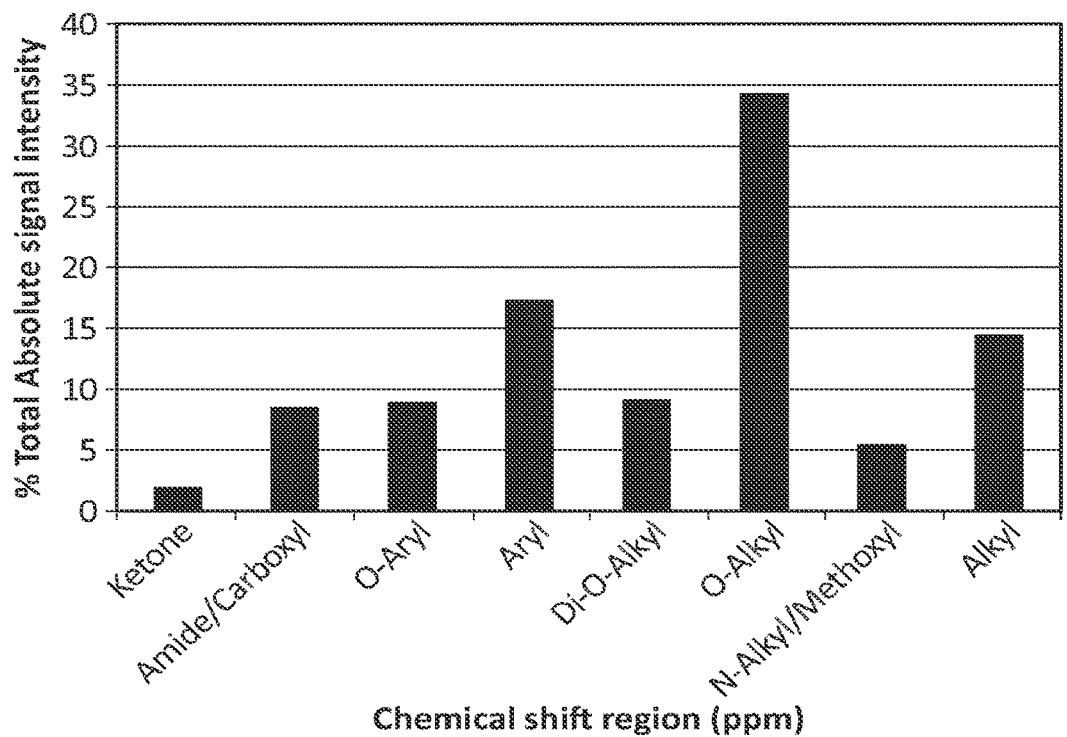
FIG. 2 is a graph showing the % of absolute signal intensity of different Carbon types in an organic waste material torrefied according to the process described herein.

The following description focuses on an embodiment in which the organic waste is chicken waste and the sterilisation process is torrefaction. It should be understood that these are used as examples, and other organic wastes could be subject to the process. Furthermore, torrefaction is most preferred, but the skilled person should appreciate that other sterilisation techniques could be performed. Nevertheless, torrefaction does provide a significant advantage in the present process by using low temperature and therefore retaining much of the carbon lability of the organic waste. The carbon labile product optimises soil health and works synergistically with the added nutrients to provide a particularly advantageous fertiliser. The core process described herein is in the making of a base material (a torrefied chicken waste) into a powder that can then be mixed with other ingredients to deliver a 'designed' nutritional outcome. The torrefied product is optimised for 'soil conditioning'. The inorganic additives add nutrient intensity and target improved plant productivity. Raw organic wastes (broiler litter, layer manure, broiler mortalities) from nearby chicken farms can be delivered to the site in bulk. These wastes will vary in nutrient and carbon content based on source farm, available bedding materials, and seasonal changes. The ratio of feeds can vary slightly based on nutrient content and desired product. In time, other organic raw materials may be used as feedstock and stored and handled at the site.

Prior to the torrefaction process, the animal waste can be stored in steel or concrete bunkers. Preferably, the waste is stored in such a way as to reduce any possible biohazard. Animal waste can be particularly hazardous to humans, particular if the subject animal is also human, so stringent health and safety measures should be taken prior to sterilisation. A batch ribbon mixer can be used to mix the poultry waste such as manure, bedding and carcasses (spent chickens). If necessary, the raw organic material can be conditioned in a shredder and or a hammer mill prior to being conveyed to the torrefier for treatment.

A Front End Loader (FEL) can load the inputs into hoppers at the desired ratios, where they can pass over weighfeeders to then be mixed in a ribbon mixer. The mixed material can be conveyed to a shredder to break the material up prior to feed into the torrefier. Torrefaction heats the material to 250-350 degrees C. in the absence of oxygen. The torrefier does this by heating material passing through a screw conveyor via radiation and conduction from a burner system underneath. This achieves two outcomes:

Removal of the bulk of the moisture from the material.
Denature any pathogens that may be present in the animal waste feedstock.

The process may achieve these outcomes but retains the carbon in a labile (usable) form as the temperature does not reach a pyrolysis point Steam and other volatile gases can be flashed off, captured and condensed in a gas cleaning system, with low nutrient loss from the bulk solid to the condensed vapours. The torrefier can be any apparatus fit for purpose. In one embodiment, the torrefier is a small screw conveyor, operated "choked" to provide an air seal. The custom-designed close-tolerance screw auger torrefier can have gas-fired external heating. The screw conveyor can be mounted above the torrefier for waste heat recovery. In operation, a torrefying temperature can be decided upon. The temperature selected is based on prior experience with the material to be torrefied. The temperature can be in the range of from about 100 degrees to about 350 degrees C. The controller will set how much power to apply to the heating elements to maintain the temperature. A thermostat may be employed to ensure that the temperature remains within a set range. After the temperature reaches the desired level, the wet bio solids (organic waste) can be introduced in a continuous fashion through the inlet port of the torrefier. The organic waste can be picked up by the screw conveyor and transported into the torrefying chamber. The rate at which material passes through the torrefier will depend on the speed of rotation of the conveyor. The heat is applied through conduction through the outer walls and via radiant heating applied to the solids during transport.

In an embodiment, the torrefier can be comprised of three screw conveyors in series with different purposes:
  a pre-heating screw whereby waste heat from the main burner heats the material prior to the main screw;
  a main screw, which has a bank of burners firing underneath it;
  a water jacketed cooling screw to lower the temperature so the torrefier
  product can be stored.

Double knife-gate valves can provide a gas seal on the inlet and outlet from each screw. The torrefier feedrate can be controlled via feedback loops that regulate the temperature of main screw outlet, which provides an inferred product moisture content (~7-10%), based on the feed material. The outlet temperature setting can be adjusted based on moisture analysis and can be limited to minimise pyrolysis of the feed material to an acceptable rate.

All torrefier inputs and the torrefier units themselves can be located in a dedicated building. This may assist in managing the risk of contamination of finished products with pathogens that may be present in raw organic material delivered to the site.

There can be three torrefier units in parallel (single feed system, single condensate system).

Once the solids have been torrefied, the treated organic material can be transported out of the torrefier. The material can fall under gravity from the torrefying chamber into a suitable container. The torrefied material can be cooled to at or just above room temperature to aid in further handling. Optionally, the cooling is the post torrefaction cooling via the water jacketed screw conveyor. The container filled with torrefied material can be a bag supported by a bag unloader. At predetermined intervals, the torrefied material can be tested to ensure that it meets the sterilisation requirements and moisture content. If there are any testing problems, the process can be stopped and the parameters in the torrefier can be adjusted.

The torrefier product can be conveyed to the adjacent granulation building for storage in intermediate silos. These silos can be designed to allow retrofit of an infeed system to support a future "hub & spoke" supply of torrefied material from on-farm torrefaction units.

The resultant torrefied product can then be sent in batches to a ribbon mixer and a hammer mill where it is ground. The material can be ground until it is a homogenous consistency. At this stage, the inorganic materials including solid and liquid inorganic nutrients can be added to the torrefied product in an industrial blender to achieve a homogenised mix. Inorganic fertilisers (eg RPR/SOP blends, Urea, DAP/MOP blends) can be delivered to site in bulk and offloaded via screw conveyor to storage silos. There can be facility for other trace nutrients (eg Zn/Cu/Mo materials) to be delivered in 1 tonne (T) bags and stored for use as needed in the future. Leonardite can be added in an amount of at least about 2, 5, 10 or 15% of the total product. Leonardite can be delivered to site in 1 tonne (T) bags and stored for use as needed. The leonardite can be added post torrefaction as it is a pathogen free material, and it is added due to its high carbon content and presence of humic acids which is thought to aid granulation and to contribute to soil heath.

To obtain finished product granules that contain a homogenous mixture of torrefied organics, leonardite and inorganic fertiliser, the materials are mixed and ground in a hammer mill to achieve the desired size reduction, then sent to the pelletisation or granulation process. Pelletisation involves transporting the mixture into a pellet extruder and cutting machine. Granulation can involve balling mills, optionally three arranged in series. At all appropriate stages, liquids can be sprayed to reduce dust.

The feed, mixing and milling processes can be continuous so to deliver a continuous stream of ground feed to the wetting mixer. Some mixtures are more suited to pelletisation that others. The skilled person can try pelletisation and granulation, to see which suits the mixture employed.

The principle of pelletising is to wet all feed to the pelletiser to a set level to achieve sufficient combining of material under pressure with sufficient lubrication to pass through the die. Not enough or too much water can result in plugging/bogging of the roll-heads and die, as well as weak product and excess fines.

For products made using pelletisation, the raw milled feed can enter the wetting mixer with recycled undersize product and water (or torrefier condensate) added to wet the mix down prior to pelletising. The pelletising/balling process is anticipated to yield approximately 70% on-size product, so about 30% of all material fed to the pelletiser is returned back as recycle (a 0.43:1 recycle ratio).

The wetted material can be fed to parallel pelletisers (2×50% duty) to generate small cylinders of product, and then to a series of balling mills to round the sharp edges of the pellets and change their shape to spheres. The balling mills are comprised of a rotating disc which throws the product into a vertical wall around the disc, which imparts a rolling action into the bulk material as it spins around the mill. Water (or torrefier condensate) can be added to aid the softening of the edges and to plasticize the pellets to change shape. Balling will also yield combination of some fines into larger on size particles. The rounded material can then fed to the downstream dryer and screening processes.

A gas burner can be used to heat air which is fed into the dryer drum to dry the granules. The dryer exhaust gases can be captured via a bag house, with an extraction fan venting the cleaned gases to atmosphere. The dry solid fertiliser product can be screened (2 deck vibrating screen). After oversize screening, the product can pass through a fines screen to remove undersize. On spec then passes through a rotary cooler drum and then a polishing screen to remove dust. Undersize from the fines and polishing screens can be recycled back to the pelletiser. The dry solid fertiliser product optionally in the form of granules can have a moisture content less than about 10, 8 or 5% (preferably less than 5%) moisture for shelf stability and to prevent (or at least reduce) the regrowth of pathogen in the granules.

Post cooling and polishing screen, the product can be conveyed to onsite storage silos for despatch into bulk trucks or fed into the on-site bagging line to be stored in 1 T bags. The finished product can be sent to final product screening. Assuming the product meets all the required standards, it can be sold in bulk or bagged and marked for sale and use.

EXAMPLES

Embodiments of the invention will now be exemplified with reference to the following non-limiting examples.

Example 1—How to Determine the Expected Nutrient Content of a Fertiliser

In order to determine the effectiveness of a fertiliser formulation, various formulations can be created in accordance with the present disclosure. The skilled person can then determine which formulation is best for use on which type of soil and for which type of plant intended to be grown in that soil. By way of example, different formulations are proposed and these can be labelled A to M for internal reference. As an example, fertiliser formulation A can be prepared by the torrefaction of organic material comprising chicken manure litter, layer manure and, spent hens. The organic material can be stored and then conveyed to a torrefier. A temperature of 150 degrees C. to about 350 degrees C. can be employed for about 5 to about 30 minutes to torrefy the waste. Once the solids have been torrefied, the treated organic material can be transported out of the torrefier and cooled before being collected into a container. Batches may be taken from the container and sent to a ribbon mixer where the torrefied material will be mixed before being ground in a mill (e.g. hammer mill) for e.g. up to 20 minutes although shorter times can be employed. Liquid and solid inorganic fertilisers such as Ammonium sulphate and APP may be added to the ground product and mixed. The organic component can be about 20-80%; binder about 5-10%; and the inorganic component about 20-70% of the total weight of the ground material. The mixed organic and inorganic materials can be sent for pelletisation.

The expected breakdown of carbon (C), nitrogen (N), phosphorous (P), potassium (K), sulphur (S) and calcium (Ca) in the fertiliser is shown in Table 1 of FIG. 1. Table 1 of FIG. 1 also shows the proposed formulation of compositions B-M that can be prepared in a similar way to that described above.

In addition to the different formulation, the time spent in the torrefier may be varied from 30 minutes to 15 minutes, 1 hour, 2 hours, 3 hours. Furthermore, the effect of temperature will be explored from 150 to up to 350 degrees C. Also, the time spent grinding may be more or less than 20 minutes.

Each of the fertilisers can then be tested on soils to determine their efficacy in promoting plant growth and overall health.

Example 2—Analysis of the Torrefied Product

The sterile nature of the torrefied organic component of the formulation is shown in FIG. 7.

An analysis of the carbon labile nature of the torrefied material was undertaken. The results are shown in FIG. 2. The torrefied material contains a range of carbon forms. The key forms of interest are:

Carboxyl C—This includes carboxylic acids, including short chain organic acids. These contribute to soil processes impacting on nutrient availability. These are easily decomposable by soil microbes.

Aryl C—These include aromatic C compounds incorporating a benzene ring structure, which is a function of more 'mature' organic materials. While these compounds also contribute to nutrient availability, they have a longer residence time in soil due to their ring structure being more resistant to microbial degradation. They may contribute to C sequestration.

O-Alkyl C—This class includes all polysaccharide (sugar-type) and carbohydrate compounds. These will stimulate localised microbial activity as they are easily-available microbial substrates. This material may also have a 'priming' effect whereby it stimulates mineralisation of other, not so available soil C sources.

Alkyl C—This class includes fatty acids, lipids and other long-chain aliphatic compounds. While these are likely to be consumed by microbes as sources of energy, they don't contribute to nutrient release or C sequestration.

Figure 3:
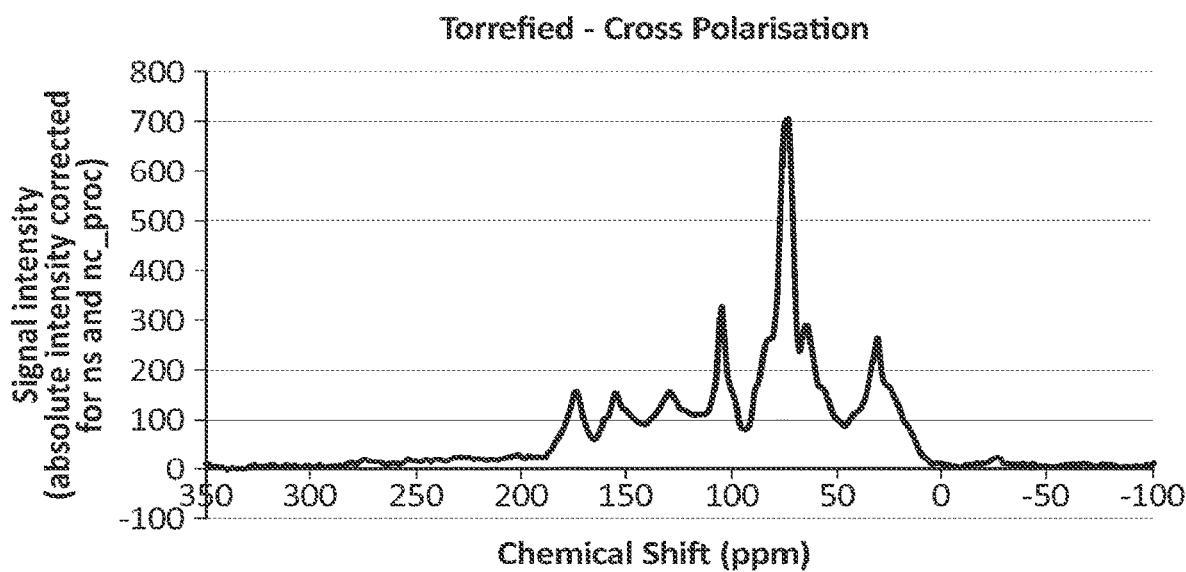
FIG. 3 is a C13 NMR spectra of an organic waste material torrefied according to the process described herein.
Figure 4:
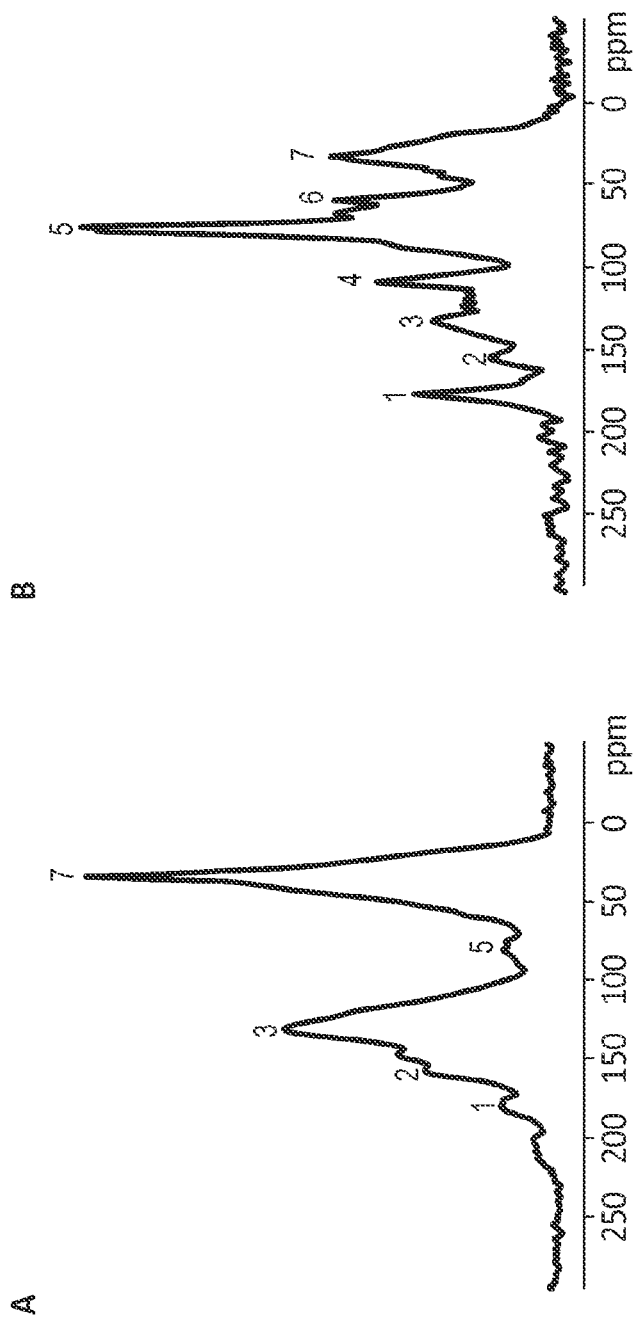
FIG. 4 are C13 NMR of (a) lignite and (b) green waste compost for comparison. Solid-state 13C NMR spectra of lignite is shown in panel A and spectra of green waste compost is shown in panel B. The labelled peaks correspond to carboxyl (Peak 1), aromatic (Peaks 2, 3), polysaccharide (Peaks 4-6) and aliphatic (Peak 7) groups (Schefe et al. 2008).

The 13C NMR spectrum is shown in FIG. 3, with the various C classes being measured as groups of peaks at different 'chemical shifts'. The large peak at about 70 ppm is the polysaccharide/carbohydrate peak. This shape of spectrum is similar to that seen in other compost-type organic amendments. So, the torrefaction retains many of the benefits of other organic processing, such as composting, while concentrating the carbon and removing pathogens. Another NMR example is shown in FIG. 4, compared with lignite and compost.

Figure 5:
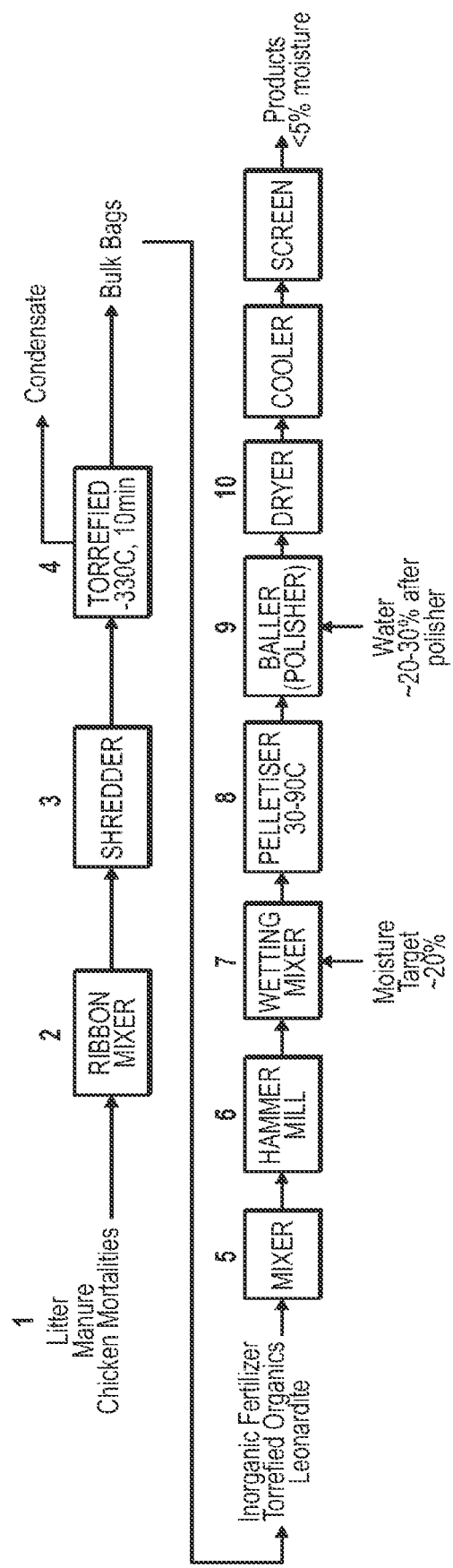
FIG. 5 is a simplified block diagram of a process according to an embodiment.
Figure 6:
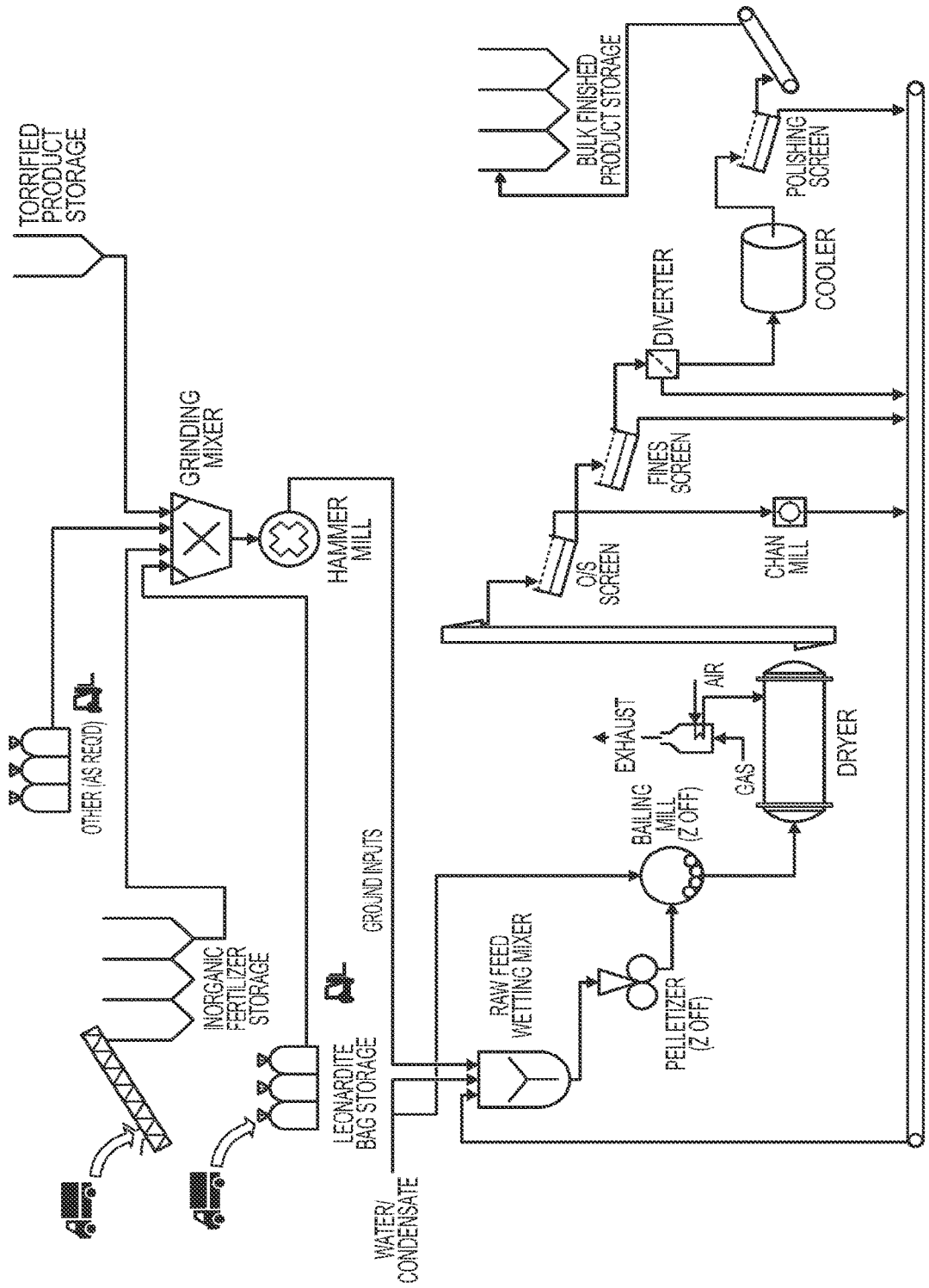
FIG. 6 is a detailed process flow diagram for an embodiment.

Example 3—a Specific Example of Preparation of a Fertiliser According to an Embodiment The flow diagrams of FIG. 5 and FIG. 6 present a schematic view of the process from the raw materials to packing of final granules. The steps are outlined below and are labelled in FIG. 5.

1. Organic raw materials (chicken litter, chicken manure, and chicken carcasses were received in separate bays).
2. All the organic raw materials were fed into a ribbon mixer at the specified ratio (e.g. Table of FIG. 13) and well mixed before entering the shredder.
3. The mix was shred into small and consistent particle size before entering the torrefaction process. This step allowed for a uniform torrefaction (heat distribution) due to consistent size.
4. The shredded mix was introduced to a torrefier unit where the mix was exposed to an elevated temperature of 330° C. in the absence of oxygen. The torrefaction process reduced the moisture of the mix significantly (from 40% moisture content to less than 10% moisture content).
5. The torrefied organic material was then introduced into a mixer with inorganic fertiliser granules and binding agent at a specified ratio e.g the Table of FIG. 13 (as per product formulation recipes).
6. The mixture of organic and inorganic material was then introduced into a hammer mill to grind the particles and further mix the material for homogeneity. An example of the homogeneity of the composition of the final mixed pellets is shown in FIG. 10.
7. The milled and homogenised mix was then introduced to a wetting station where a liquid (water or liquid fertiliser or condensate from the process) was added to the mix to prepare for pelletisation.

8. The wet mix is then introduced into the pelletiser for granulation.
9. The granules from the pelletiser were introduced to a polisher along with a liquid (water or condensate from the process) to further polish the granule surface and produce uniform spherical granules.
10. The polished granules were introduced into a drier to remove the excess moisture content. The moisture was reduced to be in the range of at least about 1% to at most about 9%.
11. The dried granules were then cooled to storage temperature possibly by ambient cooling or a fan.
12. The cooled granules were further screened for lumps and large particle size before dispatch to storage or packing.

Example 4—Choice of Torrefied Base

The animal waste used for the products was torrefied in various proportions to produce "bases". Nutrient analysis results for four of these bases are shown in Table 4 of FIG. 8. The moisture content of the bases does vary and is increased according to the presence of manure/carcass (wet) and decreases according to the presence of litter (dry materials). It has been found, however, that other than variations in moisture content, the overall nutrient content of the organic feedstock does not significantly impact the amount of labile carbon in the finished product. This means that the improved fertiliser can tolerate varying percentages of the litter/manure/carcass in the torrefied base provided the resultant carbon content is in the range of from about 30 to about 40% of total.

Figure 11:
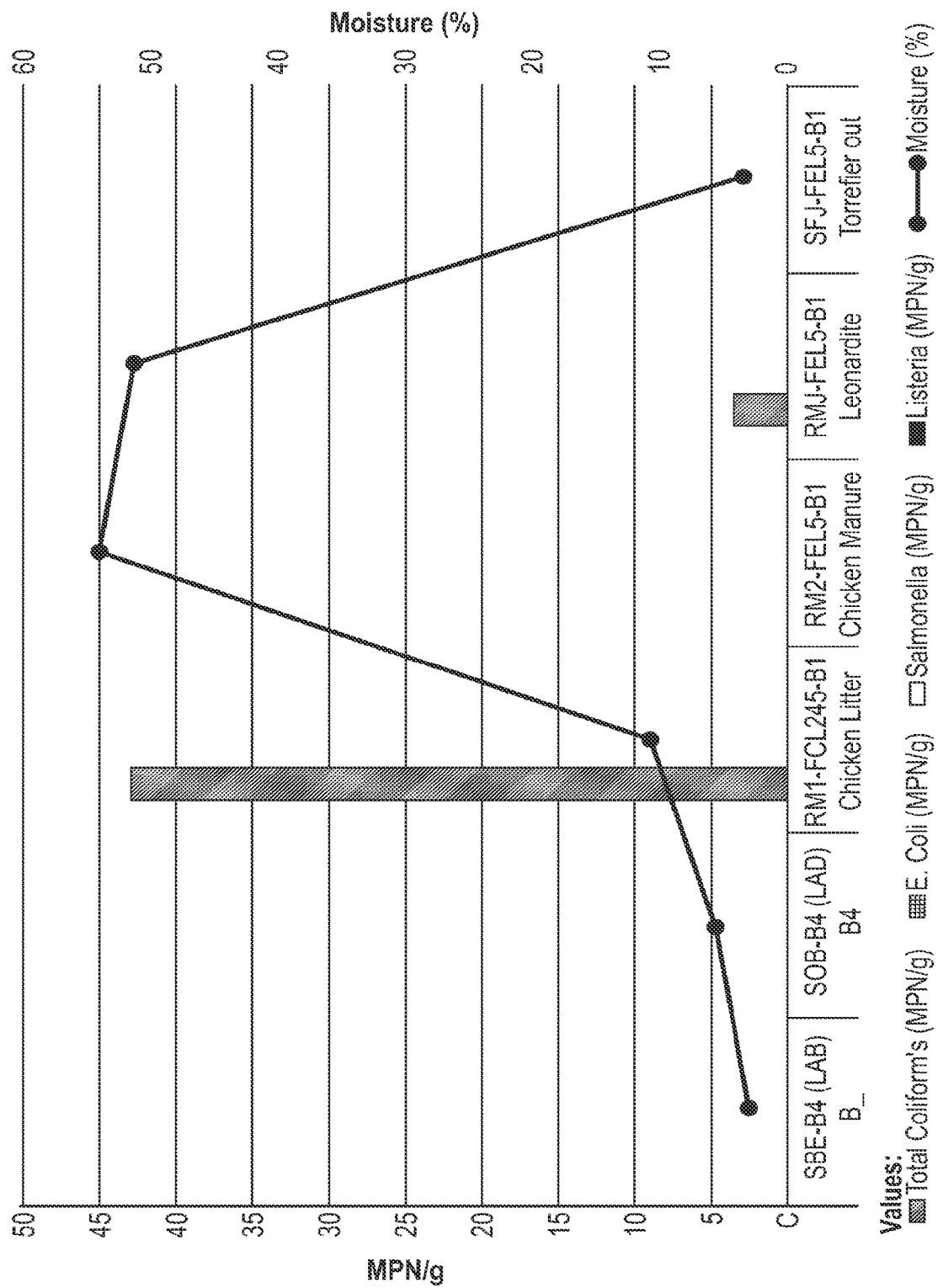
FIG. 11 is a graph showing coliform count, crush strength and moisture content.

Three batches of organic waste materials were also analysed post torrefaction by an independent laboratory (SWEP) for nutrients, carbon and pathogens. The results are shown in Table 1 of FIG. 7. As can be seen in Table 1, the torrefied product is substantially sterile due to the absence of *E. Coli, Salmonella* and *Listeria* (total coliforms (<3)). The lack of coliforms can also be seen in the graph of FIG. 11. The fertilisers labelled as B1 and B4 has no coliforms, desired hardness and desired moisture content.

Example 5—Hardness/Crush Strength

Figure 9:
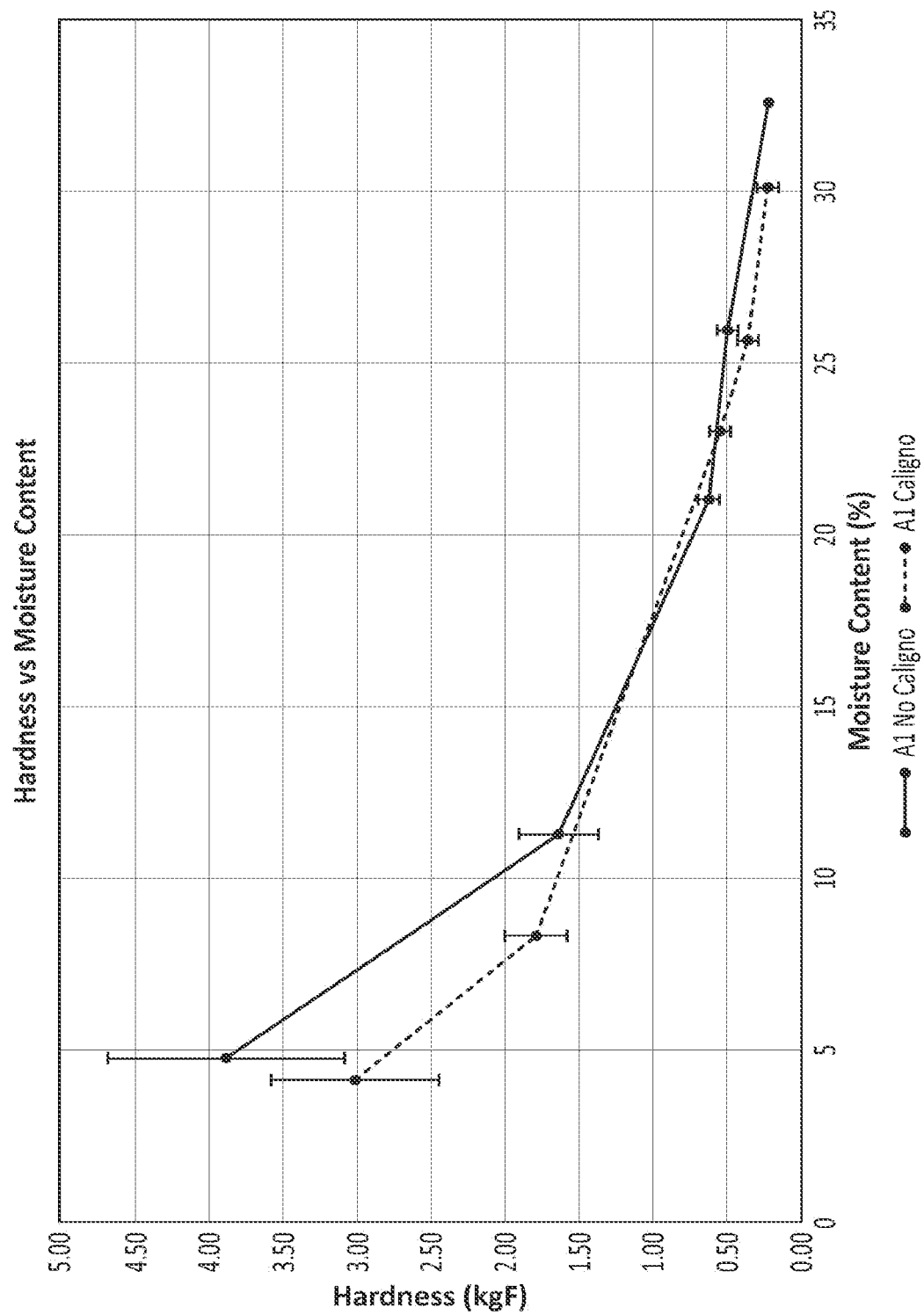
FIG. 9 is a graph of the crush strength of the granules following use of calcium lignosulphanate as a binding agent.

Crush strength which is a measure of granule hardness is used a granule performance indicator. Experiments were conducted using Lignosulphonate as granulation binder to further improve the crush strength (granule hardness). FIG. 9 shows results from one such experiment. It can be seen from the data in FIG. 9 that at a moisture content of less than 10% the hardness of the granules with calcium lignosulphanate is significantly higher than without the binder.

Example 5—Improved Fertiliser Formulations

A number of formulations were produced using a torrefaction and granulation process to manufacture fertiliser pellets including organic and inorganic materials. The torrefied organic material was then mixed with inorganic fertilisers in varying mixtures and ratios and the mixture was granulated. The compositions are shown in the Table of FIG. 13. The final granules were sent to the laboratory for nutrient, moisture and compositional analysis.

Soil incubation and glasshouse experiments were conducted in sandy soil and clay soil to understand the effect of the fertiliser product(s) in different soil structures and nutrient compositions.

Soil Incubation
Breakdown of organic material was observed in both soil types, however this was more clearly seen in the sandy soil due to the lower nutrient loading, organic matter and microbial activity compared to the clay
Release of cations was observed over the experimental period, which was reflected in the relationship between CEC, C:N ratio and Labile Carbon
Mineralisation of Potassium and Phosphorous was seen, with increased mineralisation occurring with Torrefied Organic products compared to their controls
Torrefied Organic products were observed to have similar Ammonium and Nitrate over the experimental period compared to their controls, which showed no major Nitrogen immobilisation was occurring in both soils
Due to the high organic content and microbial activity, Ammonium N was observed to convert rapidly into Nitrate N
Some Torrefied Organic products were observed to have a slower, more controlled release on N compared to their controls
Glasshouse
Performance of the product(s) is better than soil for both corn (clay) and lettuce (sandy), providing increased yield and higher nutrient uptake
The agronomic effects are more evident in the sandy soil than clay soil due higher fertility of the clay soil
Different application rates for the product (B4) were trialed, and an optimum range was identified
Two application rates were trialed for all other treatments. Varying responses were observed by product Field trials were treated with additional composted chicken manure while pot trials were treated with additional raw chicken manure. The manure/compost was added for comparison with the ABF products (e.g. B1, B4, B5, B6, B7, D5 etc) with separate applications of manure or compost followed by an application of conventional NPK fertiliser. The expectation would be that nutrient availability would be similar from either raw manure or composted manure—the composted material simply having less pathogens and in some cases a bit less nitrogen (which was lost during composting).

The % dry matter yield is dry matter (grams per pot) divided by the control (no fertiliser applied).

Hypothesis 1: Torrefied Organic Material Will Perform as Well or Better than Manure/Compost
Finding: True

| | % dry matter yield increase v's control | | | |
| --- | --- | --- | --- | --- |
| Treatment | Lettuce Pot trial sandy soil | Corn Pot trial clay soil | Field trial lettuce | Field trial broccoli |
| Manure or compost only[1] | 51 | 2 | 6 | 51 |
| C1 (torrefied organics) | 65 | 0 | 9 | 52 |

The C1 torrefied organics does not have inorganic material added (yet). This experiment is intended to demonstrate that the labile carbon in the torrefied organic material is superior to manure of compost when used alone. As can be seen from the results, the % dry matter in field trials is generally increased by the use of the torrefied material adding support for its use in an improved fertiliser composition.

Hypothesis 2: Co-Granulated Torrefied Organics/Inorganic Chemical Fertiliser Compound Will Perform as Well as Manure/Compost+NPK Chemical Fertiliser Blend Finding: True

| | % dry matter yield increase v's control | |
|---|---|---|
| Treatment | Field trial lettuce | Field trial broccoli |
| NPK blend | 23 | 119 |
| NPK blend + compost/manure | 24 | 107 |
| B4 (torrefied organics compounded with NPK) | 13 | 104 |
| B5 (torrefied organics compounded with NPK) | 18 | 120 |
| B6 (torrefied organics compounded with NPK) | 35 | 115 |

B4, B5 and B6 compositions according to embodiments of the invention each have 32.5% torrefied organic base and 67.5% inorganic material. The suffix 4, 5 and 6 are used to denote that each of the B formulations has a slightly different inorganic formulation. The exact nutrient % of the formulations are shown in the Table of FIG. 13.

When considering the performance overall, it should be borne in mind that in NPK blend+compost/manure, the formulations have to be delivered in two separate steps which is a disadvantage as described in the background section above. The improvements seen for field trial lettuce and field trial broccoli are therefore considerable improvements since the fertiliser according to an embodiment of the present invention B4, B5 and B6 was added in one step.

Hypothesis 3: Co-Granulated Torrefied Organics/Chemical Fertiliser Compound Will Perform as Well or Better than Manure/Compost+NPK Chemical Fertiliser Compound Finding: True

| | % dry matter yield increase v's control | | | |
|---|---|---|---|---|
| Treatment | Lettuce Pot trial sandy soil | Corn Pot trial clay soil | Field trial lettuce | Field trial broccoli |
| Nitrophoska | 87 | −1 | 27 | 111 |
| Nitrophoska + compost/manure | | | 26 | 107 |
| B7 (torrefied organics compounded with NO$_3$PK) | 71 | −4 | 31 | 136 |

NO$_3$PK is sometimes referred to by the trade mark Nitrophoska. The improved results with B7 when compared to Nitrophoska used alone or in combination with compost/manure should be clear from the results shown in the Table. The % dry matter yield for lettuce increased from 26% to 31% when using the improved fertiliser B7 according to an embodiment of the invention. The % dry matter yield for corn increased from 107% to 136% when using the improved fertiliser B7 according to an embodiment of the invention.

Hypothesis 4: Co-Granulated Torrefied Organics/SOA Compound Will Perform as Well or Better than SOA Finding: True

| | % dry matter yield increase vs control | | | |
|---|---|---|---|---|
| Treatment | Lettuce Pot trial sandy soil | Corn Pot trial clay soil | Field trial lettuce | Field trial broccoli |
| Sulphate of Ammonia (SOA) | 66 | 36 | | |
| B2 (torrefied organics compounded with SOA) | 138 | 66 | | |

The improved results with B2 when compared to SOA used alone should be clear from the results shown in the above Table. The % dry matter yield for lettuce increased from 66% to 138% when using the improved fertiliser B2 according to an embodiment of the invention. The % dry matter yield for corn increased from 36% to 66% when using the improved fertiliser B2 according to an embodiment of the invention.

Hypothesis 5: Co-Granulated Torrefied Organics/MAP-S—Zn Compound Will Perform as Well or Better than Granulock Z Finding: True

| | % dry matter yield increase v's control | | | |
|---|---|---|---|---|
| Treatment | Lettuce Pot trial sandy soil | Corn Pot trial clay soil | Field trial lettuce | Field trial broccoli |
| Granulock Z | 100 | 32 | | |
| B3 (torrefied organics compounded with MAP-S—Zn) | 138 | 56 | | |

MAP-S—Zn is referred to by the trade mark Granulock Z which is a registered trade mark of Incitec Pivot. The improved results with B3 when compared to MAP-S—Zn used alone should be clear from the results shown in the above Table. The % dry matter yield for lettuce increased from 100% to 138% when using the improved fertiliser B3 according to an embodiment of the invention. The % dry matter yield for corn increased from 32% to 56% when using the improved fertiliser B2 according to an embodiment of the invention.

Hypothesis: Co-Granulated Torrefied Organics/Urea Compound Will Provide Significant Yield Increases, More so with Add Si & DMP Inhibitor Finding: True

| | Lettuce Pot trial sandy soil | Corn Pot trial clay soil | Field trial lettuce | Field trial broccoli |
|---|---|---|---|---|
| D1 (torrefied organics with urea) | 38 | 77 | | |
| D5 (torrefied organics with urea + silicon + Zn + DMP) | 77 | 86 | | |

The improved results with D5 having the addition of silicon, Zinc and DMP can be seen when compared to the formulation D1. The % dry matter yield for lettuce increased from 38% to 77% when using D5 according to an embodiment of the invention. The % dry matter yield for corn increased from 77% to 86% when using the improved fertiliser D5 according to an embodiment of the invention.

Any promises made in the present description should be understood to relate to some embodiments of the invention, and are not intended to be promises made about the invention. Where there are promises that are deemed to apply to all embodiments of the invention, the right is reserved to later delete those promises from the description since there is no intention to rely on those promises for the acceptance or subsequent grant of a patent unless the context makes clear otherwise.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A method of preparing a solid fertilizer, comprising:
   heating an organic material by subjecting the organic material to heat at about 100° C. to less than 400° C. for less than 30 minutes, wherein the heating provides a product substantially free of biochar carbon;
   mixing at least one of an inorganic or synthetic material comprising at least one of N, P, K, or S with the organic material to produce a mixture; and
   forming discrete particles of the mixture, wherein the organic material and the at least one inorganic or synthetic material are uniformly distributed throughout each of the particles.

2. The method of claim 1, wherein heating the organic material provides a predominantly labile carbon product.

3. The method of claim 1, wherein the product provided by the heating is substantially sterile.

4. The method of claim 1, wherein the discrete particles comprise prills, granules, or pressed particles.

5. The method of claim 1, wherein the organic material is heated in the absence of oxygen.

6. The method of claim 1, wherein the organic material is heated at about 150° C. to less than 400° C.

7. The method of claim 1, further comprising:
   milling the organic material and the at least one inorganic or synthetic material together.

8. The method of claim 1, wherein the discrete particles comprise 1% w/w to 10% w/w leonardite.

9. The method of claim 1, wherein an average hardness of the discrete particles is at least about 2.0 Kg/granule.

10. A method of preparing a solid fertilizer, comprising:
    heating an organic material at a temperature and time sufficient to form a substantially sterile carbon product, wherein the heating at the temperature and time does not result in the formation of biochar;
    mixing at least one of an inorganic or synthetic material comprising at least one of N, P, K, or S with the substantially sterile carbon labile product to produce a homogenous mixture; and
    forming discrete particles of the homogenous mixture.

11. The method of claim 10, wherein the discrete particles further comprise a binder.

12. The method of claim 11, wherein the binder comprises at least one of leonardite or calcium lignosulphate.

13. The method of claim 11, wherein the binder is mixed with the substantially sterile carbon product.

14. The method of claim 10, wherein the organic material is subjected to heat at about 150° C. to less than 400° C.

15. The method of claim 10, wherein the organic material is heated for less than 30 minutes.

16. The method of claim 10, further comprising:
    milling the substantially sterile carbon labile product and the at least one inorganic or synthetic material together.

17. A solid fertilizer in the form of discrete particles, wherein each particle comprises:
    at least one of an inorganic or synthetic material comprising at least one of N, P, K, or S; and
    a heated organic material;
    wherein the organic material and the at least one inorganic or synthetic material are uniformly distributed throughout each of the particles, and wherein the particles comprise a mixture that is substantially free of biochar carbon.

18. The fertilizer of claim 17, wherein the organic material is subjected to heat at about 150° C. to less than 400° C.

19. The fertilizer of claim 17, wherein the organic material is subjected to heat for less than 30 minutes.

20. The fertilizer of claim 17, wherein the discrete particles comprise 1% w/w to 10% w/w leonardite.

* * * * *

UNITED STATES PATENT AND TRADEMARK OFFICE
CERTIFICATE OF CORRECTION

| | |
|---|---|
| PATENT NO. | : 11,691,929 B2 |
| APPLICATION NO. | : 17/480874 |
| DATED | : July 4, 2023 |
| INVENTOR(S) | : Walker et al. |

It is certified that error appears in the above-identified patent and that said Letters Patent is hereby corrected as shown below:

In the Claims

Column 21, Line 8, Claim 16 reads, ". . . sterile carbon labile product..." which should read, ". . . sterile carbon product..."

Signed and Sealed this
Fifteenth Day of August, 2023

Katherine Kelly Vidal
*Director of the United States Patent and Trademark Office*